(12) United States Patent
Brakob et al.

(10) Patent No.: US 12,014,375 B2
(45) Date of Patent: Jun. 18, 2024

(54) GENERATING SECURITY EVENT CASE FILES FROM DISPARATE UNSTRUCTURED DATA

(71) Applicant: Target Brands, Inc., Minneapolis, MN (US)

(72) Inventors: Christopher Brakob, Minneapolis, MN (US); Ethan Sommer, Minneapolis, MN (US)

(73) Assignee: Target Brands, Inc., Minneapolis, MN (US)

( * ) Notice: Subject to any disclaimer, the term of this patent is extended or adjusted under 35 U.S.C. 154(b) by 144 days.

(21) Appl. No.: 17/722,820

(22) Filed: Apr. 18, 2022

(65) Prior Publication Data

US 2023/0004978 A1    Jan. 5, 2023

Related U.S. Application Data

(60) Provisional application No. 63/303,329, filed on Jan. 26, 2022, provisional application No. 63/217,984, filed on Jul. 2, 2021.

(51) Int. Cl.
 *G06Q 20/40* (2012.01)
 *G06F 16/35* (2019.01)
 *G06Q 20/20* (2012.01)

(52) U.S. Cl.
 CPC ....... *G06Q 20/4016* (2013.01); *G06F 16/353* (2019.01); *G06Q 20/20* (2013.01)

(58) Field of Classification Search
 None
 See application file for complete search history.

(56) References Cited

U.S. PATENT DOCUMENTS

| | | | | |
|---|---|---|---|---|
| 6,847,393 B2 * | 1/2005 | Ashe | ........................ | G07G 3/00 |
| | | | | 348/143 |
| 7,631,808 B2 * | 12/2009 | Kundu | ................... | G06V 20/41 |
| | | | | 235/383 |
| 8,104,680 B2 * | 1/2012 | Kundu | ................... | G06Q 20/00 |
| | | | | 235/383 |
| 9,218,580 B2 | 12/2015 | Libal et al. | | |
| 9,311,645 B2 | 4/2016 | Edwards et al. | | |
| 9,569,938 B1 | 2/2017 | Lampe et al. | | |
| 9,663,345 B2 | 5/2017 | Mackey | | |

(Continued)

*Primary Examiner* — Fateh M Obaid
(74) *Attorney, Agent, or Firm* — Barnes & Thornburg LLP

(57) ABSTRACT

Described herein are systems and methods for generating security event case files with unstructured data. For example, the method can include receiving, by a computing system, unstructured data and system-based inferences from devices positioned throughout a store, and adding structure to the unstructured data and system-based inferences based on applying one or more structuring models. Adding structure can include labeling the data and system-based inferences, classifying them into security event categories, and identifying objective identifiers to identify users in the data and system-based inferences. The method also can include generating case files for each of the objective identifiers, where the case files include the associated data. The method can include determining whether the case files satisfy alerting rules. The case files can then be reported out and acted upon (e.g., based on satisfying the alerting rules) and/or stored for subsequent analysis and use.

20 Claims, 12 Drawing Sheets

(56) References Cited

U.S. PATENT DOCUMENTS

| | | |
|---|---|---|
| 10,719,716 B2 | 7/2020 | Kundu et al. |
| 11,921,765 B2 * | 3/2024 | Clark .................... G06F 16/355 |
| 2011/0022480 A1 * | 1/2011 | Hoblit .................... G07G 3/003 |
| | | 705/16 |
| 2011/0063108 A1 * | 3/2011 | Aonuma ............ G06Q 20/4016 |
| | | 340/540 |
| 2013/0169810 A1 * | 7/2013 | Hieronymus ...... G06Q 20/4016 |
| | | 348/148 |
| 2014/0214568 A1 * | 7/2014 | Argue .............. G08B 13/19613 |
| | | 705/18 |

* cited by examiner

GENERATING SECURITY EVENT CASE FILES FROM DISPARATE UNSTRUCTURED DATA

CROSS-REFERENCE TO RELATED APPLICATIONS

This application claims the benefit of U.S. Application Ser. No. 63/303,329, filed on Jan. 26, 2022 and U.S. Application Ser. No. 63/217,984, filed on Jul. 2, 2021. The disclosures of the prior applications are considered part of the disclosure of this application, and are incorporated in their entireties into this application.

TECHNICAL FIELD

This document generally describes devices, systems, and methods related to associating unstructured data to generate security event case files.

BACKGROUND

Retailer environments, such as grocery stores and other types of stores, receive many shoppers. Typically, guests enter a store, collect items they wish to purchase, and then proceed to a checkout lane to purchase the items they have collected. Occasionally guests may intentionally or unintentionally leave a store without paying for some items, though. For example, some guests may forget about items that are located underneath other items, such as items located in the bottom of a shopping cart, and may leave the store without processing those items as part of a checkout procedure. In other instances, guests may intentionally leave a store without paying for items, and may take measures to hide their activity, such as concealing items inside of a bag or clothing, or potentially swapping barcodes with other items of lower value so that that the guest goes through the checkout process, but pays for the lower value item identified by the barcode even though they are leaving with the higher value physical item. Leaving a store without paying for the full value of the item may be considered shoplifting or stealing, and may be considered a shortage with regard to inventory levels in stores.

Stores may be equipped with various technology that is capable of providing information on shoppers who leave a store with stolen items. For example, stores may have a camera security system installed that can capture video and/or images of guests who are in stores. A person, such as a security officer, may actively and continuously monitor the camera security system in an attempt to identify potential shortages and/or other security events. As mentioned above, shoplifters can hide their activities so as to avoid detection, which can frustrate efforts of security officers to stop or otherwise prevent such activity.

Moreover, if the security officer can determine that shoplifting in fact occurred, the security officer may want to report the shoplifting to local law enforcement. The security officer would have to spend significant amounts of time determining whether the shoplifting is something law enforcement would respond to. If it is, then the security office would have to spend additional time gathering enough information that can be used by law enforcement to identify and capture the shoplifter. This process can be time consuming and prone to human error, bias, and subjectivity.

SUMMARY

The document generally describes devices, systems, and methods for developing case files of security events at a store using disparate sources of data and system-generated inferences. The case files can be used proactively to objectively identify security events, to combine related information related to security events, and to manage responses to security events, including dispatching security officers to locations where security events are occurring, contacting appropriate law enforcement agencies, and/or taking other responsive actions. Security events can include any of a variety of events that pose a threat to a store's business and/or to the safety or security of the store's guests, such as shoplifting, sweet hearting, other forms of theft, assault, battery, and other security-related disturbances in a retail environment. The case files can be reported to safety and security personnel and can contain necessary information to objectively identify and apprehend shoppers who have been involved in or are currently involved in security events.

The disclosed technology can correlate data from a variety of different systems and devices located throughout retail environments, such as stores, to provide greater analysis and insights regarding security events occurring in the retail environments, including combining inferences that are automatically determined by any of a variety of systems and/or devices, such as inferences indicating a likelihood that ticket swapping may have occurred, inferences indicating whether a missed scan may have occurred at a self-checkout lane, and/or other inferences. For example, the disclosed technology can be used to provide analysis and insights regarding product shortages that may or may not relate to theft, shoplifting, or other types of security events. Using the techniques described herein, various actions and events can be classified into a discrete number of categories, which can then be mapped to specific levels of severity and, based on local jurisdictions and other policies and procedures, crimes. Depending on the severity of such activities, information collected in case files can be reported out and used by local law enforcement to objectively identify and apprehend shoppers involved in such security events.

For example, a distributed system can include edge devices that generate their own empirical data (e.g., video, images, transaction data) and build assessments off of that empirical data (e.g., whether a scanned barcode does not match an image of a product having that barcode, whether more items appear in a shopper's cart than were scanned at the checkout lane, etc.). These system-based assessments or inferences can be predictions or determinations of whether activity of a particular shopper may or may not be suspicious. Sometimes, the system-based assessments may not infer suspicion but rather just build insights about products and profitability of the store (e.g., how many shoppers purchase a particular product, whether one or more shelves have product shortages, whether and when shelf shortages are replenished by employees, which discounts shoppers take the most advantage of, etc.). The edge devices can report their assessments to a central system. The central system can label and classify the assessments along with other data generated by the edge devices to determine whether there is any suspicious activity. When suspicious activity is identified from the correlated and associated data, the central system can generate a case file that maps together this data and objectively correlates the suspicious activity with a particular shopper or group of shoppers. The case file can be automatically reported out based on a measured gravity of the suspicious activity.

For example, local law enforcement can be automatically contacted using threshold factors that can indicate severity of the documented suspicious activity. Furthermore, historic suspicious activity data and correlations can be used by the central system to determine what level and type of response may be warranted to stop the particular shopper. To avoid potential biases and other subjective factors, the disclosed technology can rely on objective identifiers to associate suspicious activity with shoppers, such as credit card numbers, license plate numbers, phone identifiers (e.g., MAC addresses if connected to WiFi), and/or other objective and unique identifiers. Therefore, a security officer or other employee at the retail environment may not have to rely on visual observations from other store employees to apprehend the shopper. Visual observations may not always be accurate and can be biased or subjective. They can be based on race, skin color, and clothes that are worn by the potential shoplifter. Sometimes, visual observations can be inaccurate if the reporting employee was not aware of any suspicious behavior in the first place. Relying on visual observations may not be sufficient to apprehend a shoplifter, during or after the shoplifting occurs. Thus, objective and unique identifiers can be utilized to apprehend suspicious shoppers.

As an example, camera footage from different areas of the store can be stitched together to demonstrate movement of a particular shopper while in the store at different times. The camera footage can also be stitched together with point-of-sale (POS) transaction data, which can include a receipt and/or one or more POS-generated inferences about potential shoplifting. An RFID system in the store can also provide information indicating a potential incident in an aisle at a first time. The disclosed technology can be used to identify, from the stitched together camera footage, whether an incident involving the particular shopper in fact occurred in the aisle at the first time. This inference can be confirmed using the POS transaction data, to identify that the particular shopper in fact shoplifted one or more items. Thus, by combining and associating such disparate unstructured data, the disclosed technology can be used to more accurately depict a story of a security event and objectively identify the particular shopper involved in that security event.

Particular embodiments described herein include a method for generating security event case files with unstructured data, the method including: receiving, by a computing system, unstructured data and system-based inferences, the unstructured data being captured by one or more devices positioned throughout a store and the system-based inferences being determined by the one or more devices positioned throughout the store and based on the unstructured data, retrieving, by the computing system and from a data store, one or more structuring models, the one or more structuring models having been trained using historic unstructured data and historic system-based inferences relating to a group of security event categories, adding structure, by the computing system, to the unstructured data and the system-based inferences based on applying the one or more structuring models, associating, by the computing system, the structured data and the structured system-based inferences with one or more of the objective identifiers, generating, by the computing system, a case file for the one or more objective identifiers, the case file including the associated data, determining, by the computing system, whether the case file satisfies one or more alerting rules, the one or more alerting rules corresponding to alerting policies for a location that is identified by the case file, and storing, by the computing system and in the data store, the case file and the determination of whether the case file satisfies the one or more alerting rules. The adding structure can include: labeling, by the computing system, the unstructured data and the system-based inferences, classifying, by the computing system, the labeled data and system-based inferences into one or more of the groups of security event categories, the groups of security event categories identifying suspicious activities that may occur in the store, and identifying, by the computing system, objective identifiers from the structured data and the structured system-based inferences, the objective identifiers identifying one or more users that appear in the structured data and the structured system-based inferences.

The method can optionally include one or more of the following features. For example, the unstructured data can include video data, image data, location signals, RFID readings, and point of sale (POS) transaction data. The one or more devices positioned throughout the store can include one or more cameras, RFID readers, location-based signaling devices, mobile devices, and POS terminal checkout lanes. The groups of security event categories can include shoplifting, sweethearting, swapping barcodes, miss-scan, forgotten item in cart, physical contact, assault, battery, felony, and crime. The one or more alerting rules can be based on at least one of jurisdiction, state law, federal law, store policies, and enterprise polices. The objective identifiers can be at least one of a credit card number, a driver's license number, a license plate, a customer number, and a MAC address.

As another example, the method can also include generating, by the computing system and based on determining that the case file satisfies one or more of the alerting rules, a security report, the security report including at least one of (i) the case file, (ii) portions of the case file indicative of suspicious activity, (iii) an objective identifier associated with the case file, and (iv) a severity level of the suspicious activity in the case file, and transmitting, by the computing system, the security report to safety and security personnel, the security report being used to objectively monitor and stop a user identified by the objective identifier associated with the case file.

In some implementations, associating, by the computing system, the structured data and the structured system-based inferences can include: assigning, for each of the structured data and the structured system-based inferences, a security event category of the plurality of security event categories, determining whether a threshold amount of the structured data and the structured system-based inferences have the same (i) security event category, (ii) objective identifiers and (iii) timestamps that are within a threshold timeframe, and linking, based on determining that the structured data and the structured system-based inferences have the same security event category, the threshold amount of the structured data and the structured system-based inferences in the same case file. Moreover, the method may also include determining, by the computing system, whether the linked data in the case file exceeds a suspicion threshold level, the suspicion threshold level being based on the threshold amount of the structured data and the structured system-based inferences having the same security event category, flagging, by the computing system and based on determining that the linked data exceeds the suspicion threshold level, the case file as representing a security event that may require alerting safety and security personnel, and flagging, by the computing system and based on determining that the linked data does not exceed the suspicion threshold level, the associated data as a benign incident that does not require alerting safety and security personnel. In some implementations, determining, by the computing system, whether the case file satisfies one or more of the alerting rules can include determining, based on the alerting policies for the location identified in the case file, at least one of: whether a quantity of same security event categories in the case file exceeds a threshold quantity, whether, over a predetermined period of time, at least a threshold quantity of linked data is flagged, by the computing system, as a security event, whether a quantity of stolen items associated with the linked data exceeds a threshold value, whether a dollar amount of the stolen items associated with the linked data exceeds a threshold value, type of the stolen items that are associated with the linked data, type of security event categories that each of the linked data is assigned, and whether safety and security personnel was alerted about one or more preexisting security events in the case file.

In some implementations, determining, by the computing system, whether the case file satisfies one or more of the alerting rules can include determining, based on the alerting policies for the location identified in the case file, whether, in the aggregate, the linked data in the case file exceeds a severity threshold level. Sometimes, the method can also include adding, by the computing system, the case file to a queue of case files to check at a later time based on determining that the case file does not satisfy one or more of the alerting rules.

One or more embodiments described herein can include a system for generating security event case files with unstructured data, the system having: one or more devices that include cameras, RFID readers, location-based signaling devices, mobile devices, and point of sale (POS) terminal checkout lanes, the one or more devices being positioned throughout a store and configured to generate unstructured data and system-based inferences about activity in the store, a data store, and a computing system in communication with the one or more devices and the data store. The computing system can be configured to: receive the unstructured data and the system-based inferences from the one or more devices, retrieve one or more structuring models from the data store, the one or more structuring models having been trained using historic unstructured data and historic system-based inferences relating to a plurality of security event categories, add structure to the unstructured data and the system-based inferences based on applying the one or more structuring models, associate the structured data and the structured system-based inferences with one or more of the objective identifiers, generate a case file for the one or more objective identifiers, the case file including the associated data, determine whether the case file satisfies one or more alerting rules, the one or more alerting rules corresponding to alerting policies for a location that is identified by the case file, and store, in the data store, the case file and the determination of whether the case file satisfies the one or more alerting rules. Adding structure can include: labeling the unstructured data and the system-based inferences, classifying the labeled data and system-based inferences into one or more of the groups of security event categories, the groups of security event categories identifying suspicious activities that may occur in the store, and identifying objective identifiers from the structured data and the structured system-based inferences, the objective identifiers identifying one or more users that appear in the structured data and the structured system-based inferences.

The system may optionally include one or more of the following features. For example, the unstructured data can include video data, image data, location signals, RFID readings, and point of sale (POS) transaction data. The one or more devices can include one or more cameras, RFID readers, location-based signaling devices, mobile devices, and POS terminal checkout lanes. The groups of security event categories can include shoplifting, sweethearting, swapping barcodes, miss-scan, forgotten item in cart, physical contact, assault, battery, felony, and crime. The one or more alerting rules can be based on at least one of jurisdiction, state law, federal law, store policies, and enterprise polices. The objective identifiers can be at least one of a credit card number, a driver's license number, a license plate, a customer number, and a MAC address.

In some implementations, the computing system can also generate, based on determining that the case file satisfies one or more of the alerting rules, a security report, the security report including at least one of (i) the case file, (ii) portions of the case file indicative of suspicious activity, (iii) an objective identifier associated with the case file, and (iv) a severity level of the suspicious activity in the case file, and transmit the security report to safety and security personnel, the security report being used to objectively monitor and stop a user identified by the objective identifier associated with the case file.

In some implementations, the computing system may also associate the structured data and the structured system-based inferences based on: assigning, for each of the structured data and the structured system-based inferences, a security event category of the groups of security event categories, determining whether a threshold amount of the structured data and the structured system-based inferences have the same (i) security event category, (ii) objective identifiers and (iii) timestamps that are within a threshold timeframe, and linking, based on determining that the structured data and the structured system-based inferences have the same security event category, the threshold amount of the structured data and the structured system-based inferences in the same case file.

The devices, system, and techniques described herein may provide one or more of the following advantages. For example, the disclosed technology provides for combining and correlating different forms of data, information, and system-generated inferences using objective factors. Labeling and classification techniques can be used to correlate the different types of information, which, at first blush, may not appear related to each other. As a result, security events can be more accurately identified. When security events are more accurately identified, involved shoppers can be apprehended before leaving the store or even after they leave the store. More accurate identification of security events can help in reducing how much shoplifting occurs in the store.

Associating unstructured data (e.g., raw data such as video feeds, images, location information) and system-based inferences (e.g., inferred conclusions such as a shopper bypassing a scanner with a product) can also be advantageous to build robust, accurate, unbiased case files. Such case files can be analyzed to determine appropriate response actions. Such case files can also be used to identify suspicious customers without relying on subjective or biased visual observations made by security officers, store employees, and/or other shoppers. Objective identifiers, such as credit card numbers and MAC addresses, can be correlated with the other data and system-based inferences when generating the case files and linking the case files to particular shoppers. As a result, human-made bias in identifying and stopping shoplifters can be mitigated or otherwise avoided. Since the objective identifiers are used, a shoplifter can also be more easily identified. For example, the shoplifter can change clothes or their hair color, which would make previous visual observations of that shoplifted ineffective in identifying the shoplifter the next time they enter the store. However, if the shoplifter uses the same credit card, phone, or car, identifiers associated with each of those can be used to positively and objectively identify the shoplifter, even if they change their outward appearance.

As another example, the disclosed technology can be used to generate insights and analysis about potential product shortages in the store. The disclosed technology can provide for correlating and associated different pieces of data to determine how popular certain products are, how long shelves remain empty before they are replenished, and other insights. Thus, the disclosed technology can be used to determine when products are in high demand and when product shortages are related to the high demand rather than theft or other security events.

The disclosed technology can also provide for generating one-click security reports that can be automatically reported out to safety and security personnel, such as local law enforcement. The disclosed technology can determine when to report a security event to safety and security personnel using a variety of severity factors. The factors can relate to jurisdiction, state law, store policy, business policy, value of items stolen, quantity of items stolen, and other objective factors. Typically, if a security officer or other store employee seeks to report shoplifting to law enforcement, the officer would have to spend significant amounts of time determining whether the shoplifting is something law enforcement would respond to and would also have to gather information that could be used by law enforcement to identify and capture the shoplifter. This process can be time consuming and prone to human error, bias, and subjectivity. The one-click reports described herein, on the other hand, can be automatically generated and can include objective information that was stitched together using the techniques described herein. The reports can therefore be robust and used by safety and security personnel to objectively identify and stop the shopper(s) associated with the reports. Bias and other subjective factors that may otherwise be used to identify and stop shoplifters can be mitigated or otherwise avoided.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

This document relates to creating associations among different types of unstructured data (e.g., video, missed scan detection data, object mismatch data) and system-generated inferences to identify security incidents and shoppers involved in such incidents. Moreover, the disclosed technology provides for generating case files based on the identified security events. Further analysis of severity of the identified security events can be used to determine whether, when, and how to engage safety and security personnel, which can include in-store employees whose jobs are directed towards safety and security in a store and/or law enforcement.

Figure 1:
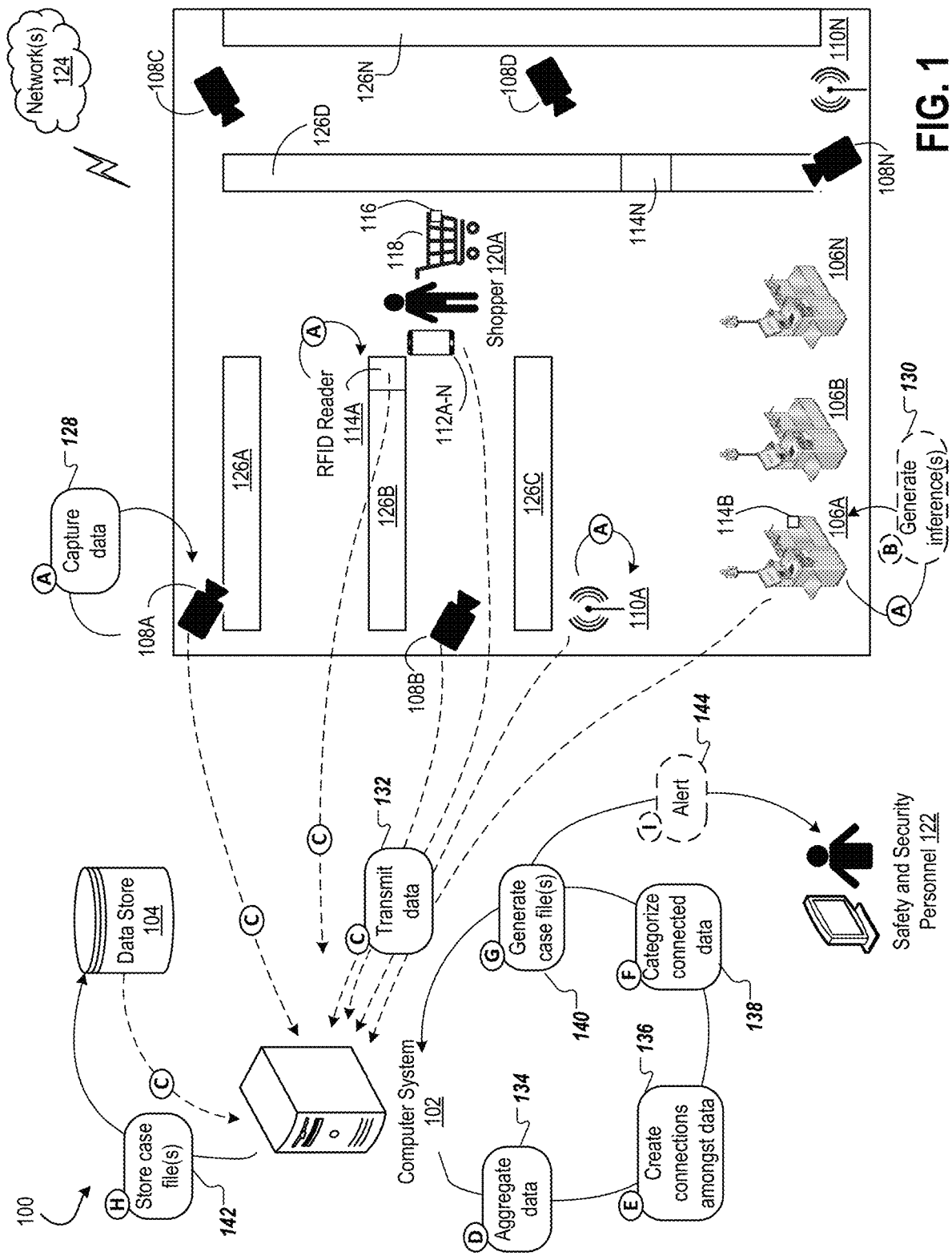
FIG. 1 is a conceptual diagram of generating case files for security events in a store environment.

Referring to the figures, FIG. 1 is a conceptual diagram of generating case files for security events in a store environment 100. The store 100 can be a retail environment, such as a grocery store, clothing store, or other type of store. The store 100 can include shelves 126A-N. The shelves 126A-N can be arranged into aisles that shoppers can move up and down. The shelves 126A-N can include a variety of items that the shoppers can purchase. The store 100 can also include point-of-sale (POS) checkout lanes 106A-N. For example, the POS checkout lanes 106A-N can be self-checkout lanes. One or more of the POS checkout lanes 106A-N can also be checkout counters with an employee who scans a shopper's items from their cart.

The store 100 can also include different devices and/or systems that are placed throughout the store 100. The devices and/or systems can be used to track movement of shoppers and items in the store 100. The devices and/or systems can be edge devices that perform edge computing processing techniques. As described throughout this disclosure, the devices and/or systems can generate unstructured data as well as inferences based on the unstructured data. The devices and/or systems can be in communication with a computer system 102 via network(s) 124. The computer system 102 can be a central computing system, computer, server, and/or network of computers or servers. The devices and/or systems can transmit, to the computer system 102, the unstructured data and inferences. The computer system 102, as described herein, can further process the transmitted information to identify security events and build case files.

The devices and/or systems placed throughout the store 100 can include cameras 108A-N, location-based signaling devices 110A-N, and RFID readers 114A-N. One or more additional or fewer types of devices and/or systems can be placed throughout the store 100.

The cameras 108A-N can be placed at various locations throughout the store 100. In the example of FIG. 1, camera 108A is placed near shelf 126A. Camera 108B is placed between shelves 126B and 126C. Cameras 108C and 108D are placed between shelves 126D and 126N. Moreover, camera 108N is placed near the POS checkout lanes 106A-N and the shelf 126D. The cameras 108A-N can be configured to continuously capture image and/or video data of the store 100. One or more of the cameras 108A-N can be high resolution cameras. One or more of the cameras 108A-N can be low resolution cameras. One or more of the cameras 108A-N can also be pan-tilt-zoom cameras. One or more of the cameras 108A-N can be wide angle cameras to capture more activity in the store 100. The cameras 108A-N can be any other camera configurations that are already installed in the store 100. For example, the cameras 108A-N can be part of a security camera system or CCTV system.

The location-based signaling devices 110A-N can also be placed at various locations throughout the store 100. In FIG. 1, device 110A is placed near the shelf 126C. Device 110N is placed between the shelves 126D and 126N. The devices 110A-N can be placed in various other locations as well. The devices 110A-N can be configured to identify when shoppers pass the devices 110A-N or are nearby the devices 110A-N. The devices 110A-N can generate timestamps indicating when a shopper passes or is nearby. Moreover, the devices 110A-N can communicate with mobile devices of shoppers to identify locations of such shoppers in the store 100 and to associate the generated timestamps with the shoppers. For example, shopper 120A has mobile device 112A. Mobile device 112A can be a cell phone, smartphone, laptop, tablet, or other mobile computing device that the shopper 120A may bring with them to the store. If the shopper 120A moves towards or comes into range with the location-based signaling device 110A, the location-based signaling device 110A can ping the mobile device 112A and receive a mobile device identifier, such as a MAC address. The MAC address can be correlated with a timestamp generated by the device 110A that indicates the shopper 120A was nearby. Thus, the location of the shopper 120A in the store 100 at a particular time can be documented by the device 110A using an objective identifier, the MAC address of the mobile device 112A.

The RFID readers 114A-N can also be positioned in various locations throughout the store 100. For example, RFID reader 114A is positioned at an end of the shelf 126B. RFID reader 114B is placed at or part of POS checkout lane 106A. RFID reader 114N is positioned along the shelf 126D. RFID readers 114A-N can be placed in various other locations throughout the store 100. The RFID readers 114A-N can be configured to detect when an RFID tag comes within a vicinity or range of the readers 114A-N. RFID tags can be attached to shopping carts, baskets, and other equipment used in the store 100. For example, the shopper 120A can be pushing a shopping cart 118 around the store 100. The shopping cart 118 can have an RFID tag 116, which can be used to identify the shopping cart 118. Each shopping cart in the store 100 can have a unique RFID tag. In FIG. 1, as the shopper 120A pushes the shopping cart 118 past or near the RFID reader 114A, the reader 114A can detect the RFID tag 116 on the shopping cart 118. The reader 114A can, for example, determine that the shopping cart 118 was near the shelf 126B at a time at which the reader 114A detected the RFID tag 116. Similarly, when the shopper 120A moves the shopping cart 118 to the POS checkout lane 106A, the RFID reader 114B can detect the RFID tag 116 and identify that the shopping cart 118 is at the POS checkout lane 106A at a particular time.

Still referring to FIG. 1, one or more of the devices and/or systems 108A-N, 110A-N, 114A-N, and 106A-N can capture data (step A, 128). For example, the cameras 108A-N can continuously capture image and/or video data in their designated locations. The location-based signaling devices 110A-N can generate timestamps and indications of when shoppers, such as the shopper 120A, passes by or comes into a range of the devices 110A-N. The RFID readers 114A-N can similarly generate timestamps and indications of when shopping carts having RFID tags, such as the shopping cart 118 having the RFID tag 116, come within range of the readers 114A-N. The POS checkout lanes 106A-N can also capture data such as scanned items, images of items in a shopper's shopping cart, and transaction receipts/bills.

One or more of the devices and/or systems 108A-N, 110A-N, 114A-N, and 106A-N can also generate inferences based on the captured data (step B, 130). For example, one or more of the devices may not generate inferences. One or more of the devices may only generate inferences when the devices determine there may be suspicious activity based on the captured data.

For example, the shopper 120A can scan products at the POS checkout lane 106A. The POS checkout lane 106A can include a camera configured to capture image data of an area around the POS checkout lane 106A. Using edge computing, the POS checkout lane 106A can analyze the image data and match it to barcodes of the products that the shopper 120A scanned. The POS checkout lane 106A can determine that there is a mismatch between products that appear in the image data and products that are scanned. The mismatch can indicate that the shopper 120A may be shoplifting. Accordingly, the POS checkout lane 106A can generate an inference that the shopper 120A may be engaged in suspicious activity.

As another example, the RFID reader 114A can identify that shopper 120A passing by the shelf 126B with the shopping cart 118 at a first time. The shopper 120A can continue moving between the shelves 126B and 126C. Once the shopper 120A reaches the end of the shelves 126B and 126C, the shopper 120A can decide to turn around, walking back the same way that they came. Thus, when the shopper 120A reaches the end of the shelves 126B and 126C, the RFID reader 114A can identify the shopping cart 118 at a second time. Using edge computing, the RFID reader 114A can determine an amount of time that passed between the first time and the second time. The RFID reader 114A can infer, based on the amount of time that passed, whether the shopper 120A spent longer between the shelves 126B and 126C than expected. If the shopper 120A spent longer than expected, the RFID reader 114A can infer that the shopper 120A may be engaged in suspicious activity.

Alone, the RFID reader 114A's inference may not positively identify that the shopper 120A in fact engaged in suspicious activity. However, in combination with image data from the camera 108B, for example, the computer system 102 can determine that the shopper 120A spent a longer time than expected between the shelves 126B and 126C because the shopper 120A was looking at their mobile device 112A. Thus, the shopper 120A did not in fact engage in suspicious activity. As another example, in combination with the image data from the camera 108B, the computer system 102 can determine that the shopper 120A spent a longer time because the shopper 120A was trying to swap barcodes on two products. Thus, the computer system 102 can positively identify that the shopper 120A engaged in suspicious activity.

Still referring to FIG. 1, one or more of the devices and/or systems 108A-N, 110A-N, 114A-N, and 106A-N can transmit data to the computer system 102 (step C, 132). The data can include unstructured data that is captured by the devices and/or systems 108A-N, 110A-N, 114A-N, and 106A-N. The data can also include inferences that are generated by the devices and/or systems 108A-N, 110A-N, 114A-N, and 106A-N. The data can be transmitted at predetermined times. For example, the data can be transmitted when requested by the computer system 102. In yet some implementations, the data can be transmitted as it is captured. For example, the cameras 108A-N can transmit live feeds of images and/or videos that are captured. As another example, the location-based signaling devices 110A-N can transmit location data whenever movement is detected within ranges of such devices 110A-N. The RFID readers 114A-N can also transmit data whenever RFID tags 116 of shopping carts 118 are detected within ranges of such devices 114A-N. Moreover, the POS checkout lanes 106A-N can transmit data, such as receipts, credit card information, scanned items, and inferences, whenever a transaction is made at such checkout lanes 106A-N.

The computer system 102 can also retrieve data from a data store 104. The data can include historic unstructured data, historic system-based inferences, structured data, and other data pertaining to security events and suspicious activity in the store 100. All of the data that is received by the computer system 102 can be used to determine whether security events occurred and to generate case files for identified security events.

Thus, the computer system 102 can aggregate the data (step D, 134). The computer system 102 can compile and filter all of the data that was received. The computer system can also apply one or more machine learning-trained models to the unstructured data to add structure that data. Adding structure to the data can include labeling the data and classifying the data based on those labels. For example, a model can be trained to identify, from image data, a person peeling a barcode off of a product. The model can be applied to the image data received from the cameras 108A-N. Using the model, the computer system 102 can identify a moment in which the shopper 120A in fact removed a barcode from one product and put it on another product. The computer system 102 can label this moment in the image data and classify it as a barcode swap or other suspicious activity classifier.

Similarly, a model can be trained to identify, from POS transaction data and inferences, whether the shopper 120A did not scan all products in the shopping cart 118 and/or whether the shopper 120A scanned barcodes that do not match the products in the shopping cart 118 or otherwise at the POS checkout lane 106A. Using the model, the computer system 102 can label and classify the POS transaction data as indicative of suspicious behavior, such as shoplifting.

As another example, a model can be trained to stitch together different image data from the cameras 108A-N. Thus, the computer system 102 can apply the model to all of the received image data and output a continuous image feed tracking the shopper 120A as they move throughout the store 100.

The computer system 102 can then create connections amongst the aggregated data (step E, 136). The computer system 102 can apply one or more machine learning-trained models to the aggregated data. For example, the models can be trained to correlate aggregated data based on their labels and/or classifications. Thus, if image data and POS transaction data both are labeled as barcode swap, the computer system 102 can determine that these two pieces of data correlate with each other.

As another example, the computer system 102 can create connections by correlating the aggregated data with the shopper 120A. For example, using one or more models, the computer system 102 can correlate (1) a timestamp of an RFID reading from the RFID reader 114A with (2) image data of the shopper 120A swapping a barcode on a product near the shelf 126B, and (3) a receipt from the POS checkout lane 106A. By correlating (1)-(3), the computer system 102 can positively identify that a barcode swap occurred and the shopper 120A is involved in shoplifting. Moreover, by connecting and correlating (1)-(3), the computer system 102 can objectively identify the shopper 120A by a credit card number or a customer number from the receipt. Such objective identification can be used to track the shopper 120A in the future and potentially stop the shopper 120A from committing any additional crimes.

The computer system 102 can categorize the connected data (step F, 138). Categorizing the data can include determining a severity of the suspicious activity that is inferred from connecting the data. For example, the computer system 102 can determine whether the shopper 120A's shoplifting amounts to a crime according to state law, local laws, federal law, store policies, and/or other protocol and procedures. Categorizing the data can be location-based and/or store site specific. For example, a business can have multiple stores 100 across the country. The stores 100 located in a first state can have certain rules about dealing with suspicious activity that the stores 100 in a second state may not have. For example, categorizing the data can also include determining whether the connected data actually represents product shortages that are not tied to criminal activity or other security events.

Once the data is categorized, the computer system 102 can generate case files (step G, 140). A case file can be generated per identified security event/suspicious activity. When multiple case files are generated that involve the same shopper, the case files can be linked together. For example, a case file can be generated per shopper that is involved in identified security events/suspicious activity. Thus, the case file can include an aggregate of all the security events associated with that shopper. Whenever a security event is identified, it can be added to the shopper's case file.

The computer system 102 can store the case file(s) in the data store 104 (step H, 142). The case file(s) can be retrieved by the computer system 102 and used in further analysis. For example, the computer system 102 can alert safety and security personnel 122 (step I, 144). The computer system 102 can determine whether the case file indicates a security event so severe that it warrants intervention by safety and security personnel 122. The computer system 102 can apply one or more machine learning trained models to the case file(s). Using the models, the computer system 102 can assess a severity of the security event(s) outlined in the case file(s). The computer system 102 can assess the severity of the security event(s) relative to rules based on jurisdiction, state law, federal law, store policies, and/or other protocol and procedures.

If the computer system 102 determines that safety and security personnel 122 should be alerted, then the computer system 102 can generate one-click security reports that get reported out. The reports can be generated based on the case file(s). The reports can provide a snapshot of the security event and objective identifiers that can be used to identify the shopper involved in the security event. Thus, the reports can include necessary information that can be used by safety and security personnel 122 in order to objectively and unbiasedly identify and stop the shopper at a time that the security event occurs or at a future time.

Figure 2:
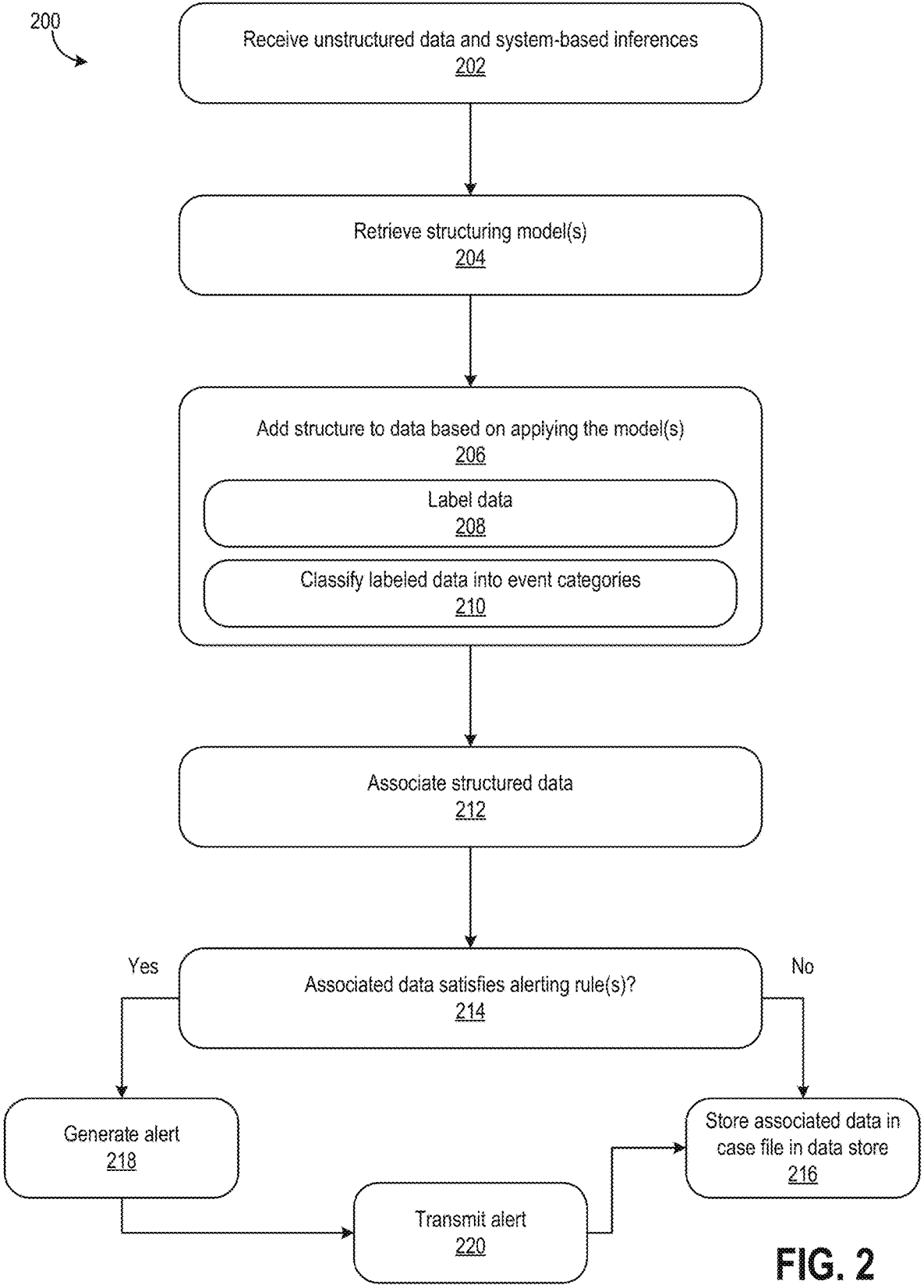
FIG. 2 is a flowchart of an overview process for identifying security events using the disclosed techniques.

FIG. 2 is a flowchart of an overview process 200 for identifying security events using the disclosed techniques. The process 200 can be performed by the computer system 102. The process 200 can also be performed by one or more other computing systems, servers, devices, or network of computing devices. For illustrative purposes, the process 200 is described from a perspective of a computer system.

Referring to the process 200, the computer system can receive unstructured data and system-based inferences in 202. As described in reference to FIG. 1, the computer system can receive this information from one or more devices and systems that are placed throughout a store. For example, the unstructured data can be a video or image feed that is captured by security cameras in the store. System-based inferences can include identification of a barcode mismatch at a POS checkout lane.

The computer system can also retrieve structuring model(s) in 204. The model(s) can be trained using machine learning techniques, such as a convolution neural network (CNN). By using the model(s), the computer system can apply structure to the unstructured data and system-based inferences. By applying structure, the computer system can glean more insights about how the data can be stitched together and used to paint a store of a security event. For example, the computer system can retrieve different structuring models for different types of unstructured data and/or system-based inferences. For example, one or more models can be trained to add structure to image data. One or more other models can be trained to add structure to location data. One or more other models can be trained to add structure to RFID readings. One or more other models can also be trained to add structure to POS transaction details, such as receipts and system-based inferences that the POS checkout lane can make.

The computer system can then add structure to the unstructured data and system-based inferences based on applying the model(s) in 206. Adding structure can include labeling the data and system-based inferences (208). Adding structure can also include classifying the labeled data and system-based inferences into event categories (210). Thus, one or more of the models can be trained to identify features in the data and system-based inferences indicative of suspicious activity. Those features can be labeled as such. The computer system can then categorize the data based on those labels.

As an illustrative example, when adding structure to a video feed of a shopper at a checkout lane, the computer system can, using one or more models, identify that the shopper scanned a barcode once but put two of a same product associated with that barcode into a shopping bag. The shopper's action can be labeled as potential shoplifting. For example, other footage of the shopper scanning and bagging other products can be discarded or otherwise not labeled. The computer system can then classify the labeled segment of the video feed into an event category, such as shoplifting at checkout.

The computer system can classify labeled data into a multitude of event categories. The event categories can include security and non-security events. Each of the security and non-security event categories can also have sub-categories. For example, the security event category can have sub-categories that include shoplifting, shoplifting at checkout, shoplifting at shelves, sweethearting, barcode swap, miss-scan, assault of employee, assault of other shopper(s), theft, etc. The non-security event can include sub-categories such as accidentally leave store without paying, product shortage on shelves, employee miss-scans, product placed on wrong shelf, etc. One or more additional or fewer event categories can be realized and used when classifying the labeled data in 210. For example, each store can have different event categories. For example, an enterprise can have different event categories based on location of each store of the enterprise (e.g., based on region, state, county, town, etc.).

Next, the computer system can associate the structured data in 212. For example, the computer system can link structured data that have been labeled and classified into same event categories. The computer system can further link structured data based on objective identifiers of a shopper that appears across the structured data. The computer system can also link the structured data based on similar or same timestamps across the structured data. For example, data can be linked together based on a threshold amount of data confirming some security event category. For example, if only video data is labeled and classified as theft but there are no POS transaction receipts, RFID readings, and/or location-based data also classified as theft or otherwise related to the video data, then the computer system can determine there is not enough evidence to associate such data and classify the associated data as theft.

Referring to the illustrative example above of the shopper who scanned the barcode once but bagged two of the same product, the segment of video feed depicting this action can be labeled and classified as shoplifting. That segment of the video feed can also include a timestamp, which can be linked to a timestamp of the POS transaction at the checkout lane. Once the shopper completes scanning products, the shopper can provide their credit card information to the POS terminal. The credit card information can be used to pay for the products and to record the transaction. The shopper can leave the store with their receipt and products. The timestamp on the receipt can be used with the timestamp of the segment of the video feed to link the video feed and POS transaction. Moreover, the credit card information can be used to objectively identify the shopper. The computer system can further identify the product associated with the barcode that was scanned once, determine how much the product costs, and also determine where in the store the product is placed on display. The computer system can access data that was captured around the area where the product is on display and determine whether that data includes the shopper and/or is labeled and classified in similar event categories as the segment of the video feed and the POS transaction. For example, an RFID reader near a shelf of the product can identify a particular shopping cart by its RFID tag when the cart passed by the RFID reader at some time before the timestamp of the segment of the video feed and the POS transaction. An RFID reader near the POS checkout lane can also identify the same shopping cart by its RFID tag at some time just before the timestamp of the segment of the video feed and the POS transaction. The computer system can link the two RFID readings with the segment of the video feed and the POS transaction since the same shopping cart was identified where the product that was scanned once is located in the store and also when the shopper scanned only the one barcode at checkout. The computer system can continue to link or associate the structured data, thereby creating a more robust and accurate picture of the security event. By linking the structured data, the computer system can generate a more definitive inference that the security event occurred.

Next, the computer system can determine whether the associated data satisfies alerting rules in 214. The alerting rules can be specific to jurisdiction, state laws, federal laws, store policies, enterprise policies, etc. For example, in some states, law enforcement may only respond to shoplifting that involves battery or assault. As another example, in stores of a same enterprise that are located within one geographic region, safety and security personnel may be alerted only when shoplifting involves a certain quantity or value of items stolen. As yet another example, in all stores in the enterprise, safety and security personnel may be alerted only when a particular shopper is involved in a certain number of security events. One or more other alerting rules can be used when determining whether to report out about the associated data.

If the associated data satisfies alerting rules, then the computer system can generate an alert in 218. The alert can include necessary, objective information to assess the security event and identify the involved shopper. The alert can include relevant portions of the associated structured data. The alert can also be used by safety and security personnel to objectively identify the involved shopper. For example, the alert can include objective identifiers associated with the shopper, such as a credit card number, MAC address, and/or license plate number. The alert can also include image and/or video feed data that depicts the shopper caught in the act of shoplifting. The alert can also include image and/or video feed data of the shopper's movements, which can also be used to identify the shopper.

The computer system can automatically transmit the alert to the appropriate party or parties in 220. For example, the computer system can assess a severity of the security event depicted by the associated data to determine who to report out to. The more severe or serious the security event or events, the more likely the computer system can determine to report the security event or events to safety and security personnel. For example, the computer system can report the security event to law enforcement when the security event includes some sort of battery, assault, or confrontation. As another example, the computer system may report the security event to in-store employees whose jobs are directed to safety and security in the store when the shopper is involved in multiple security events but each security event involved minimal quantities or values of stolen items. For example, the computer system can also report the security event to other stores in the enterprise or network of stores. As a result, in-store employees at the other stores can become aware of shoppers who may or may not cause a security event in those stores.

Automatically generating the alert (218) and transmitting the alert (220) to safety and security personnel can be more time efficient and accurate than other alerting techniques. The alerting described herein may not require an in-store employee to comb through all the unstructured data and determine, using human observations, whether or not a security event occurred. Instead, the alerting described herein can avoid human-based error that may occur and can provide for more accurate analysis and determinations about security events. Moreover, automatically generating the alert saves the in-store employee from having to use their time generating a report about the security event and documenting what happened in the security event. Instead, the in-store employee can use their time more efficiently by performing other tasks in the store (which can include looking for suspicious shoppers as they enter and exit the store and/or replenishing product shortages on the store shelves).

Once the alert is transmitted, the computer system can store the associated data in a case file in a data store in 216. As described throughout this disclosure, the case file can be used to objectively identify the shopper involved in the security event. The case file can link the shopper with all security events that the shopper is involved in. The case file can include the associated data and any other relevant information that can be used to identify what happened during the security event as well as to identify the shopper. For example, the case file can include labeled segments of video data depicting the shopper caught in the act of shoplifting. The case file can include a credit card number, a license plate number, and/or a MAC address associated with the shopper. The case file can also include dates, product types, quantities, and values of items stolen. For example, the case file can also include links to criminal record files associated with the particular shopper.

Referring back to block 214, if the associated data does not satisfy alerting rules, then the computer system can store the associated data in a case file in a data store in 216. The case file can be the same as described above. Moreover, the case file can still document the security event and the involved shopper, as described above. The case file, however, may not be reported out to safety and security personnel because the security event may not have been severe enough to warrant reporting out. For example, as information is added to the case file (e.g., the shopper becomes involved in another security event, a new objective identifier is identified for the shopper, etc.), the case file can be assessed by the computer system to determine whether the shopper should be reported. In other words, over time, the case file can grow. As the case file grows over time, the shopper may pose a greater threat to the store or network of stores. Thus, at a later time, the computer system can assess the case file, determine whether it satisfies alerting rules, and then report out if alerting rules are satisfied.

Figure 3A:
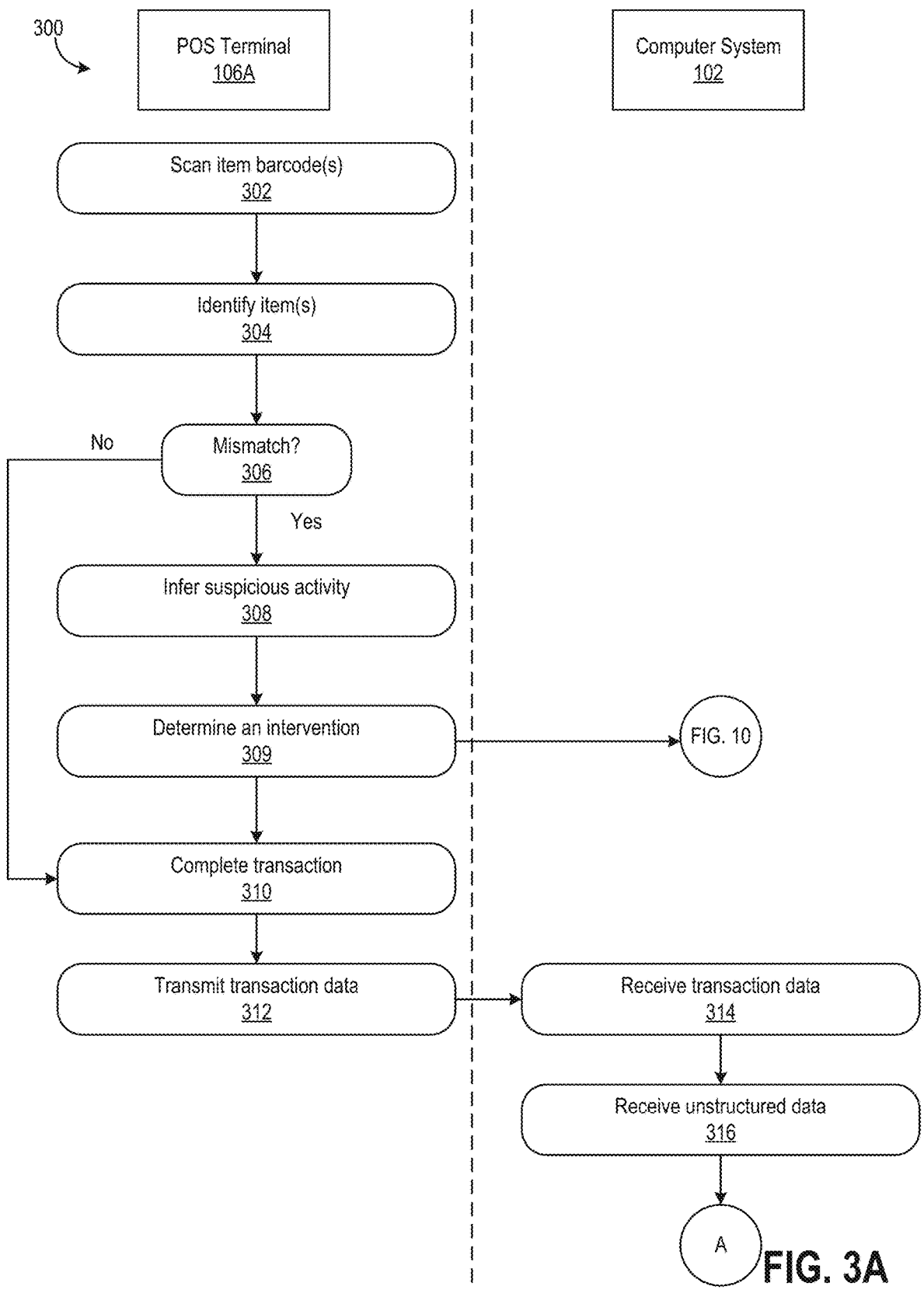
FIGS. 3A-B is a swimlane diagram of a process for generating associations between unstructured data.
Figure 3B:
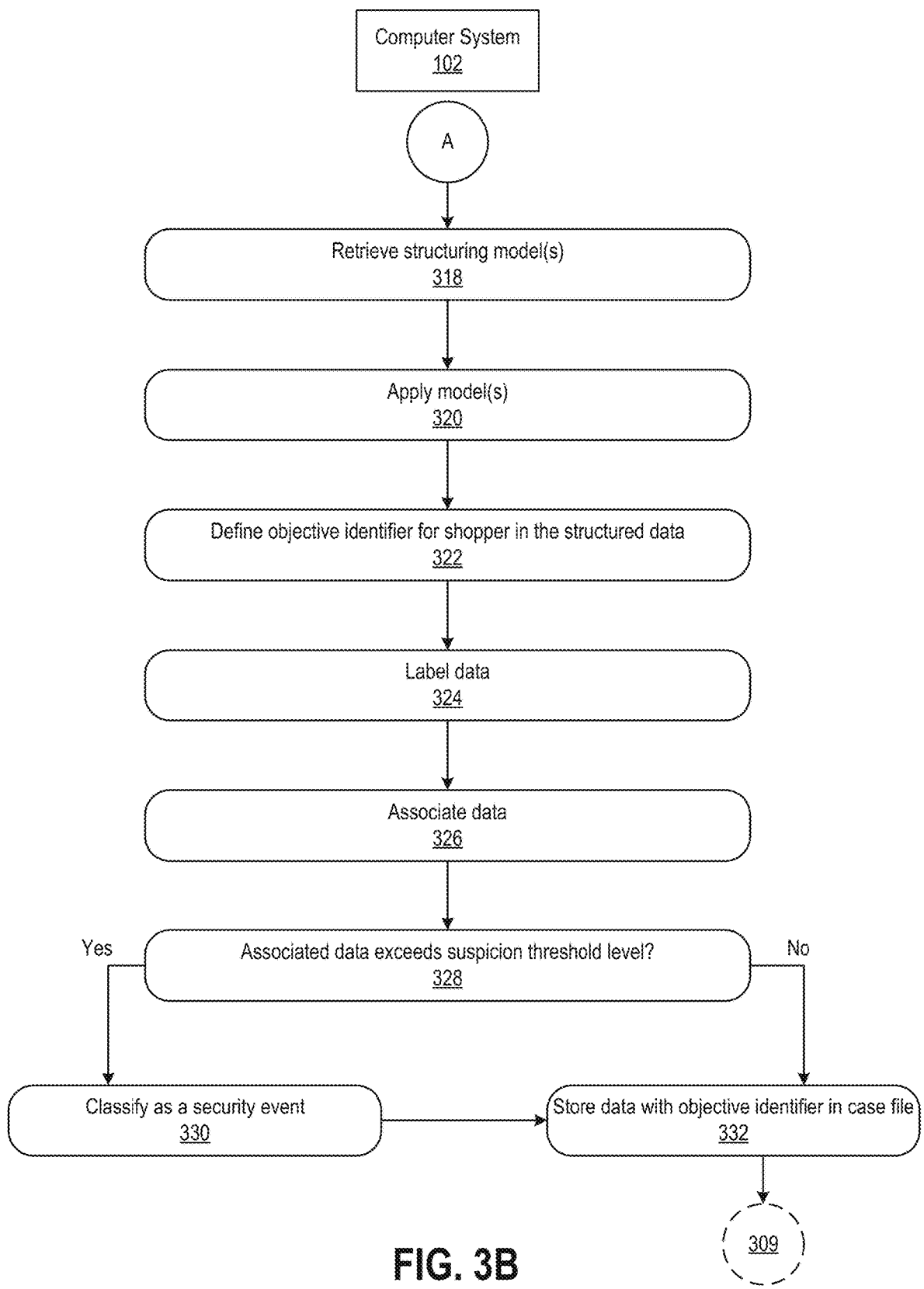

FIGS. 3A-B is a swimlane diagram of a process 300 for generating associations between unstructured data. The process 300 is described in reference to an illustrative example in which a shopper is checking out at a checkout lane. The process 300 can also be applied to different scenarios in a store, as described throughout this disclosure. One or more blocks in the process 300 can be performed by the POS terminal at the checkout lane 106A. One or more blocks in the process 300 can also be performed by the computer system 102. One or more blocks in the process 300 can be performed by one or more other computers, computing systems, devices, servers, and/or network of devices. For example, one or more blocks in the process 300 can be performed by another POS terminal, a security camera, an RFID reader, and/or a location-based signaling device, as described in reference to FIG. 1. For illustrative purposes, the process 300 is described from perspectives of the POS terminal 106A and the computer system 102.

Referring to the process 300 in both FIGS. 3A-B, the POS terminal 106A can scan item barcode(s) in 302. For example, a shopper can pass items over a barcode scanning device of the POS terminal 106A. The barcode scanning device can scan the barcodes such that the POS terminal 106A can determine what item is scanned and how much it costs.

The POS terminal 106A can also identify the scanned item(s) in 304. For example, one or more cameras can be positioned at the POS terminal checkout lane 106A. The cameras can capture images of an area surrounding the POS terminal 106A. Using edge computing and machine learning trained models, the POS terminal 106A can identify the items from the captured images. For example, the POS terminal 106A can extract item features from the captured images (e.g., a label, packaging, color, shape, texture, etc.). The extracted item features can be labeled and associated with different items. For example, the extracted item features can be associated with a particular item (e.g., all round containers with a distinct packaging color and text are a particular brand of soap). The extracted features can also be associated with a group of items that may have such features (e.g., all long, green items can be grouped as vegetables).

The POS terminal 106A can then determine whether there is a mismatch between the scanned item barcode(s) and the identified item(s) in 306. The POS terminal 106A can, for example, compare the scanned barcodes to the classified items from the image data. One of the scanned barcodes can be associated with a travel toothbrush, but the POS terminal 106A may only have identified a bottle of soap and vegetables from the captured images. Thus, the POS terminal 106A can determine that there is a mismatch between the scanned barcodes and the identified items.

If the POS terminal 106A identifies a mismatch, then the POS terminal 106A can infer suspicious activity in 308. In other words, the POS terminal 106A can make an inference that the shopper at the POS terminal 106A is engaging in shoplifting, ticket swapping, or some other suspicious activity.

In 309, the POS terminal 106A can determine an intervention. In other words, because suspicious activity is inferred, some intervention may be appropriate in real-time to prevent the shopper from completing the checkout process and/or from leaving the store environment. In some implementations, the POS terminal 106A can determine that an intervention may be warranted and the computer system 102 can determine an actual type of intervention to perform. In some implementations, the POS terminal 106A can determine the actual type of intervention to perform.

The type of intervention to perform can be based on one or more factors. For example, the type of intervention to perform can be based on a confidence level associated with the inferred suspicious activity. The higher confidence that the shopper engaged in suspicious activity, the more likely that some intervention should be performed in real-time, such as preventing the shopper from continuing with the checkout process (e.g., by locking the POS terminal 106A). The lower confidence that the shopper engaged in suspicious activity, the less likely that some intervention should be performed in real-time. Instead, the suspicious activity can be flagged and the process 300 can continue as described below. Thus, if the confidence of suspicious activity exceeds some predetermined threshold level, it can be determined that an intervention should be performed in real-time.

The type of intervention to perform can also be based on a dollar value of the item that is mismatched or involved in the inferred suspicious activity. If the dollar value of the item mismatch exceeds a predetermined threshold level, a more immediate intervention can be determined and performed in real-time. For example, if the item mismatch involves an item that costs over $100, it can be determined (e.g., by the POS terminal 106A and/or the computer system 102) that an intermediate intervention should be performed, such as locking the POS terminal 106A to prevent the shopper from continuing to scan items or from completing the checkout process and/or sending safety and security personnel to the POS terminal 106A to stop the shopper. If the dollar value is less than the predetermined threshold level, then it can be determined that an immediate, real-time intervention is not warranted. The process 300 can then continue as described further below.

Figure 10:
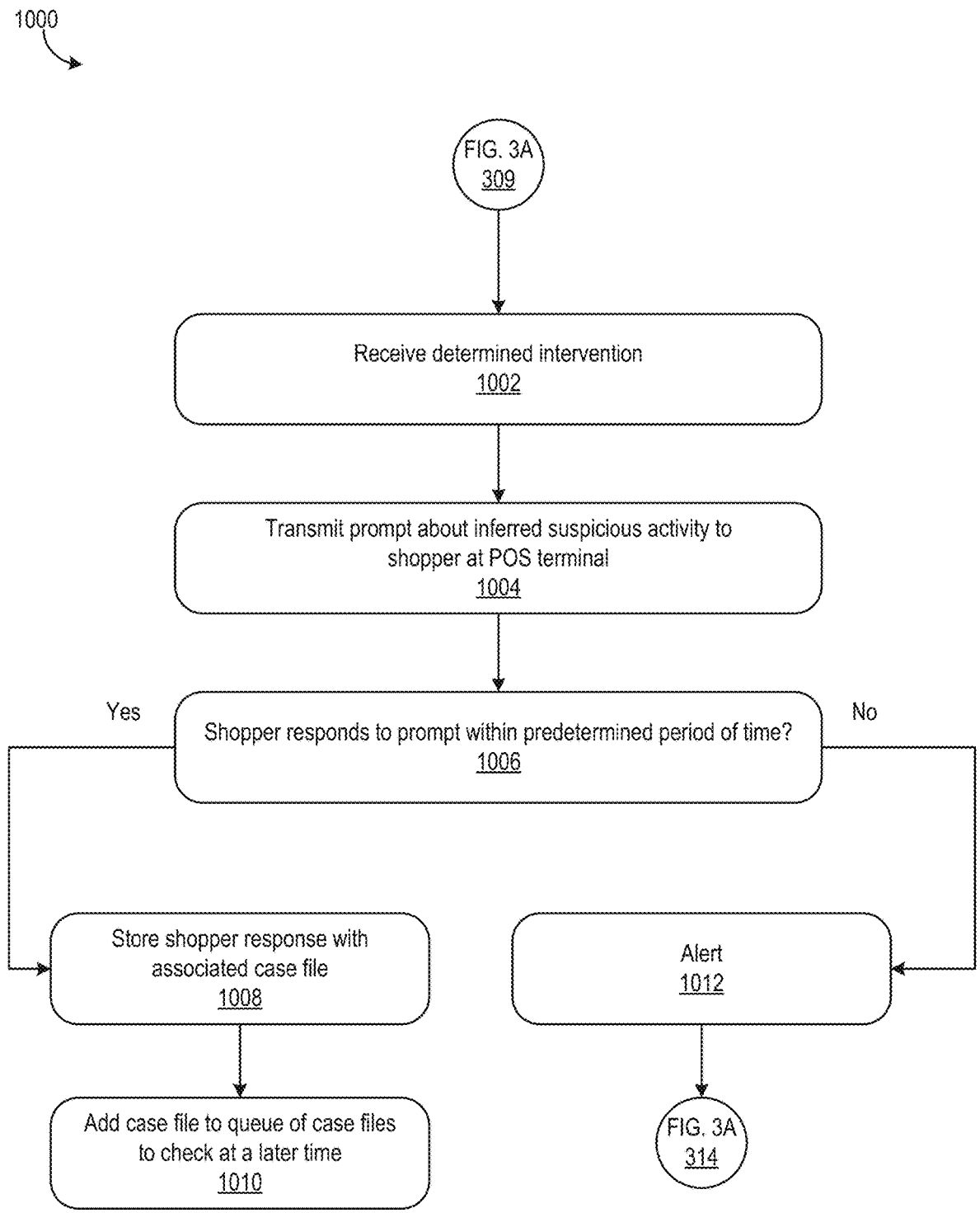
FIG. 10 is a flowchart of an example process for determining whether to intervene when suspicious activity is inferred during a transaction.

The intervention can include notifying the shopper that there is an item mismatch, asking the shopper to rescan the mismatched item, asking the shopper to scan a government-issued ID card, asking the shopper to stop scanning items, etc. The intervention can also include notifying safety and security personnel of the inferred suspicious activity. As a result, the safety and security personnel can interject by, for example, approaching the shopper at the POS terminal 106A during the checkout process, thereby preventing the shopper from completing the checkout process and/or leaving the store environment. Once the POS terminal 106A determines that an intervention should occur, the determined intervention can be transmitted to the computer system 102. Refer to FIG. 10 for further discussion about the real-time intervention process.

The POS terminal 106A can complete the transaction in 310. Since the POS terminal 106A merely inferred suspicious activity, the transaction can be completed. Completing the transaction can include receiving payment information from the shopper.

If the POS terminal 106A does not identify a mismatch in 306, then the POS terminal 106A can determine that there is no suspicion and that the shopper scanned all of the items that were identified by the POS terminal 106A. Thus, the POS terminal 106A can complete the transaction in 310.

Once the transaction is complete, the POS terminal 106A can transmit transaction data to the computer system 102 in 312. The transaction data can be transmitted in real-time during the transaction or checkout process. The transaction data can also be sent at a later time, such as after the checkout process is completed (e.g., the shopper provides payment information and leaves the store). In some implementations, the transaction data can be sent in data packets that include transaction data for multiple different transactions that occurred at the POS terminal 106A over some predetermined period of time (e.g., every hour, every 2 hours, every 24 hours, etc.). The POS terminal 106A can transmit a receipt to the computer system 102. The POS terminal 106A can also transmit a customer number, payment information (e.g., credit card number), list of items purchased, quantity of each item purchased, value amount of each item purchased, and time of transaction. The POS terminal 106A can also transmit any inferences of suspicious activity. Along with the inferences, the POS terminal 106A can transmit images identifying items that were scanned or not scanned at the POS terminal 106A. Thus, the POS terminal 106A can transmit information that can be used by the computer system 102 to positively identify shoplifting or otherwise affirm the POS terminal 106A's inference of suspicious activity.

The computer system 102 can receive the transaction data in 314. The computer system 102 can receive the data after the transaction is complete. For example, the data can be received during the transaction (e.g., as items are being scanned and/or identified at the POS terminal 106A). For example, the data can be received at predetermined times. For example, the POS terminal 106A can transmit transaction data for a plurality of transactions at the predetermined time. The POS terminal 106A can also transmit transaction data for each transaction once that transaction is complete. For example, the computer system 102 may only receive transaction data when the POS terminal 106A infers suspicious activity associated with that transaction. In yet some implementations, the computer system 102 may receive the transaction data when the computer system 102 requests that data from the POS terminal 106A.

The computer system 102 can also receive unstructured data in 316. As described throughout this disclosure, the unstructured data can be received from one or more devices and/or systems in the store, including but not limited to cameras, RFID readers, mobile devices, location-based signaling devices, and other POS terminal checkout lanes. For example, the computer system 102 can receive the unstructured data before receiving the transaction data. For example, the transaction data can be part of the unstructured data. In yet some implementations, the computer system 102 can receive the unstructured data and after analyzing the unstructured data, can request the transaction data from the POS terminal 106A.

Still referring to the process 300 in FIGS. 3A-B, the computer system 102 can retrieve structuring model(s) in 318. As described herein, the computer system 102 can retrieve structuring models that correspond to the transaction data and/or types of the unstructured data that were received by the computer system 102.

The computer system 102 can then apply the model(s) in 320, as described throughout this disclosure. By applying the model(s) to the transaction data and the unstructured data, the computer system 102 can add structure to the data.

The computer system 102 can define one or more objective identifiers for a shopper who is identified in the structured data. The computer system 102 can define the objective identifiers using one or more machine learning trained models. For example, the computer system 102 can identify, using a model, the shopper by their credit card number from the transaction data. As another example, the computer system 102 can identify the shopper by a MAC address of their mobile device based on location-based signal data. As yet another example, the computer system 102 can identify the shopper by a license plate number from cameras that are trained on a parking lot of the store.

The computer system 102 can also label the structured data in 324. As described throughout this disclosure, the computer system 102 can use one or more machine learning trained models to label and classify the structured data. For example, the computer system 102 can label the data before defining objective identifiers for the shopper.

The computer system 102 can associate the data in 326. As described throughout this disclosure, the computer system 102 can link data from the different devices and/or systems based on the objective identifiers, timestamps, labels, and/or classifications into event categories. For example, the shopper's credit card number (e.g., the objective identifier) can be used to link the transaction data from the POS terminal 106A with video footage of the shopper from one or more cameras in the store. As another example, the computer system 102 can determine whether a threshold amount of the data is identified by a same security event category. Moreover, if such data is identified with same objective identifiers, that data likely can be associated and used to build a case file for the shopper. Even more so, if such data has timestamps that fall within a threshold timeframe, then the data likely pertains to the same shopper.

Once associations are made, the computer system 102 can determine whether the associated data exceeds a suspicion threshold level in 328. For example, the computer system can determine whether there is enough associated data to raise an inference of suspicious activity (e.g., the inference of suspicious activity made by the POS terminal 106A in 308) to a positive identification of suspicious activity, such as theft or shoplifting. The suspicion threshold level can be based on a variety of factors. For example, the suspicion threshold level can be based on a minimum quantity of data that infers the same suspicious activity, as mentioned above. The suspicion threshold level can also be based on jurisdiction, state laws, federal laws, store polices, enterprise policies, etc.

If the associated data exceeds the suspicion threshold level, then the computer system 102 can classify the associated data as a security event in 330. In other words, the computer system 102 can positively identify that some security event occurred that involved the particular shopper. The computer system can then store the associated data with the objective identifier in a case file in 332. The case file can also include an indication that the associated data is classified as a security event.

If the associated data does not exceed the suspicion threshold level in 328, the computer system 102 may determine that there is not enough indicia, data, or evidence to raise an inference of suspicious activity to an actual identified security event. Thus, the computer system 102 may store the associated data with the objective identifier in the case file in 332. As described herein, data can be added to the case file over time. As the data is added and analyzed by the computer system 102, the computer system 102 may determine that the suspicion threshold level is met. At such a time, the computer system 102 can classify the associated data as indicative of a security event.

After the computer system stores the data with the objective identifier in the case file in 332, the process can return to block 309, and the POS terminal 106A and/or the computer system 102 can determine an intervention. Blocks 309-332 can be repeated. For example, if the associated data is classified as a security event in 330 and this classification is stored in the case file in 332, the POS terminal 106A and/or the computer system 102 can determine in 309 that safety and security personnel should intervene in real-time and prevent the shopper from leaving the store environment. One or more other interventions can be determined and performed, as described further in FIG. 10.

In some implementations, blocks 314-332 can be performed in real-time, during a transaction or checkout process. In some implementations, blocks 314-332 can be performed at a later time, such as after the transaction or checkout process is completed. In yet some implementations, the computer system can perform blocks 314-332 for a batch of transactions that occurred over some predetermined period of time (e.g., the computer system performs blocks 314-332 simultaneously for all transactions that occurred at the POS terminal 106A from 8 AM-9 AM on a particular day).

Figure 4:
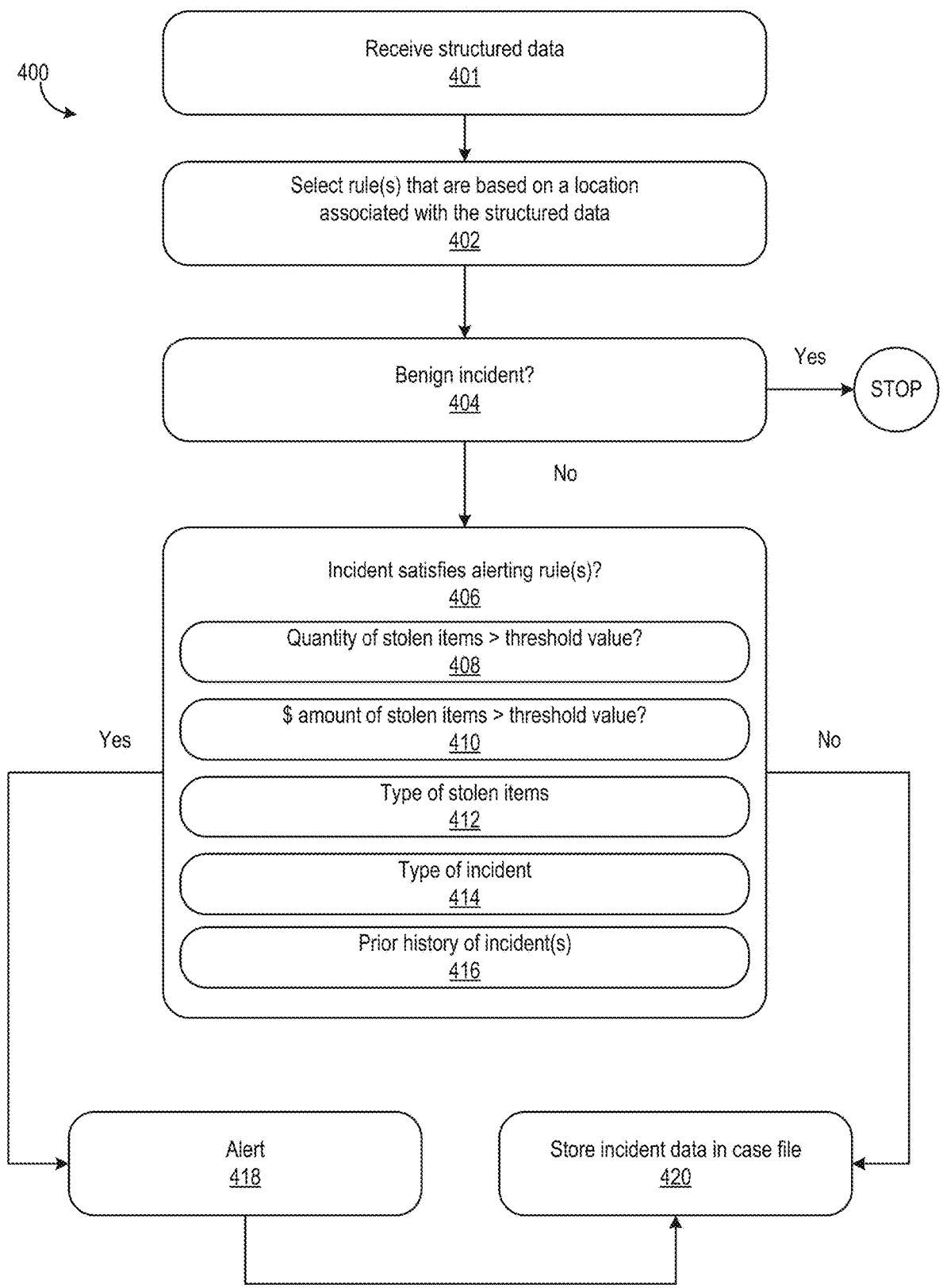
FIG. 4 is a flowchart of a process for determining whether to alert about an identified security event associated with a shopper.

FIG. 4 is a flowchart of a process 400 for determining whether to alert about an identified security event associated with a shopper. The process 400 can be performed after the computer system 102 classifies associated data as a security event (e.g., refer to block 214 in FIG. 2; blocks 328-330 in FIGS. 3A-B). The process 400 can be performed by the computer system 102. The process 400 can also be performed by one or more other computing systems, servers, devices, or network of computing devices. For illustrative purposes, the process 400 is described from a perspective of a computer system.

Referring to the process 400, the computer system can receive structured data in 401 (e.g., refer to steps D-G in FIG. 1; blocks 206-212 in FIG. 2; blocks 322-326 in FIGS. 3A-B). The computer system can then select rule(s) that are based on a location associated with the structured data in 402. The computer system can identify a location that the structured data is associated with. Using that location, the computer system can retrieve, from a data store, one or more rules corresponding to that location. The rule(s) can be used to determine whether the structured data is indicative of a security event and/or whether the structured data should be reported out to safety and security personnel. The computer system can select the rule(s) that correspond to the location identified by the structured data because each location can have different rules. Different stores in a network of stores can have different reporting rules. The reporting rules can be based on geographic region or location. The rules can also be based on jurisdiction, state laws, and/or federal laws.

Using one or more of the selected rules, the computer system can determine whether the structured data indicates a benign incident in 404. For example, rules associated with a first location can identify a security event only when a certain quantity of items are stolen by a shopper. If the computer system determines, from the structured data, that the shopper did not meet the quantity of items threshold, then the computer system can determine that the structured data represents a benign incident for that first location (even if, in a different location, the quantity of items stolen by the shopper may indicate a security event). In such a case, the process 400 can stop.

If, on the other hand, the computer system determines that the structured data does not represent a benign incident (e.g., the shopper stole more than the quantity of items threshold associated with the first location), then the computer system can proceed to 406. Thus, the computer system can determine in 404 that the structured data represents a security event.

In 406, the computer system can determine whether the incident satisfies one or more alerting rule(s). As mentioned above, the alerting rule(s) can be specific to the location that is associated with the structured data. One or more factors that may result in alerting in the first location may not result in alerting in a second location. Moreover, some locations may require multiple alerting rules to be satisfied before the computer system can alert about the incident.

The one or more alerting rule(s) can include whether a quantity of stolen items is greater than a threshold value (408). As an illustrative example, at the first location, the incident may only arise to an alerting level if the shopper steals 10 items, regardless of whether the items are a same type of item. This alerting rule can also indicate different quantity of stolen items based on price of such items and/or type of such items. As an illustrative example, at the first location, the incident may arise to an alerting level if the shopper steals 2 electronic devices but may not arise to an alerting level if the shopper steals 5 bananas or other produce. As another illustrative example, at the first location, the incident may arise to an alerting level if the shopper steals one electronic device that costs more than $50 but may not arise to an alerting level if the shopper steals underwear and socks (e.g., necessity items) that, in aggregate, costs more than $50.

Another alerting rule can be whether a dollar amount of the stolen items is greater than a threshold value (410). As an illustrative example, at the first location, the incident may arise to an alerting level if, in the aggregate, the shopper stole over $50 worth of items in one incident, regardless of what type of items or quantity of items were stolen. As mentioned above, For example, the dollar amount of the stolen items can be different based on quantity of items stolen and/or type of items stolen.

Another alerting rule can be type of stolen items (412). The types of stolen items can include electronics, produce, frozen foods, groceries, clothes, office supplies, furniture, baby clothes, toys, books, kitchenware, appliances, sports, etc. The types of stolen items can also include sub-types, such as vegetables, fruits, bread, meats, and fish for groceries and TVs, headphones, chargers, cables, and batteries for electronics. For example, the types of stolen items can include necessities and non-necessity items. As an illustrative example, in the first location, the incident may arise to an alerting level if the shopper stole non-necessity items (e.g., TVs, books, toys), regardless of what type of non-necessity items were stolen. As another example, in a second location, the incident may arise to an alerting level if the shopper stole a certain quantity of electronics and/or a certain quantity of clothes, regardless of whether such items are necessities or non-necessities. For example where a store is located in a less affluent neighborhood, the incident may not arise to an alerting level if the shopper stole necessities, since the shopper may not be able to afford buying the items needed to live. On the other hand, in a more affluent neighborhood, the incident may arise to an alerting level if the shopper stole necessities, such as clothes and produce, since the shopper more likely can afford buying the items needed to live. Thus, alerting rules based on type of items stolen can be location-specific.

Yet another alerting rule can be type of incident (414). Such a rule can be based on location as well as whether safety and security personnel would actually respond to the incident. For example, for example, law enforcement may only respond to theft if it rises from a felony to a crime. As an illustrative example, in the first location, the incident can arise to an alerting level if the incident involves battery and/or assault. As another example, in the first location, the incident can be reported to in-store employees whose jobs are directed to safety and security in the first location if it involves theft of a certain quantity, type, and/or value of items but the incident may not be reported to law enforcement unless the incident involves bodily harm.

Another alerting rule can be based on prior history of incident(s) (416). As illustrative examples, in the first location, the incident can arise to an alerting level if the identified shopper was involved in other incidents, regardless of whether such incidents were previously reported out or whether the incidents were benign. In a second location, the incident can arise to an alerting level only if the identified shopper was involved in other security incidents, not benign incidents. In a third location, the incident can arise to an alerting level only if the identified shopper was involved in incidents within a certain period of time.

One or more additional or fewer alerting rules can be used by the computer system in 406. Moreover, different locations associated with the structured data can employ one or more of the rules mentioned above and/or additional or fewer other alerting rules.

If the computer system determines that the incident satisfies one or more or any of the alerting rule(s) that are used in 406-416, then the computer system can alert appropriate parties in 418. For example, some of the alerting rules may require alerting in-store employees at the store but not law enforcement. Some of the alerting rules may require alerting law enforcement but not the in-store employees. Some of the alerting rules may require alerting both law enforcement and in-store employees. In yet some implementations, some of the alerting rules may require alerting other relevant stakeholders in the store and/or an enterprise that operates the store. For example, some of the alerting rules may require alerting in-store employees and/or law enforcement in other locations where stores of the same enterprise are located. As a result, parties in the other locations can become aware of potential shoppers to look out for and/or apprehend.

As described throughout, the alert can include structured data about the incident that can be used by the parties to identify the shopper and/or stop the shopper from getting involved in subsequent security incidents.

The computer system can also store the incident data in a case file in 420, as described herein. For example, the computer system can store the incident data in the case file before alerting the appropriate parties. In such an example, the computer system can send the entire case file to the appropriate parties with the alert.

If the computer system determines that the incident does not satisfy one or more or any of the alerting rule(s) that are used in 406-416, then the computer system can store the incident data in a case file in 420. For example, the computer system can add the incident data to an existing case file for the shopper. As mentioned throughout, the case file can be assessed at a later time to determine whether it includes any incidents that arise to an alerting level. Thus, the case file can be used to keep track of and monitor security incidents associated with different shoppers.

Figure 5:
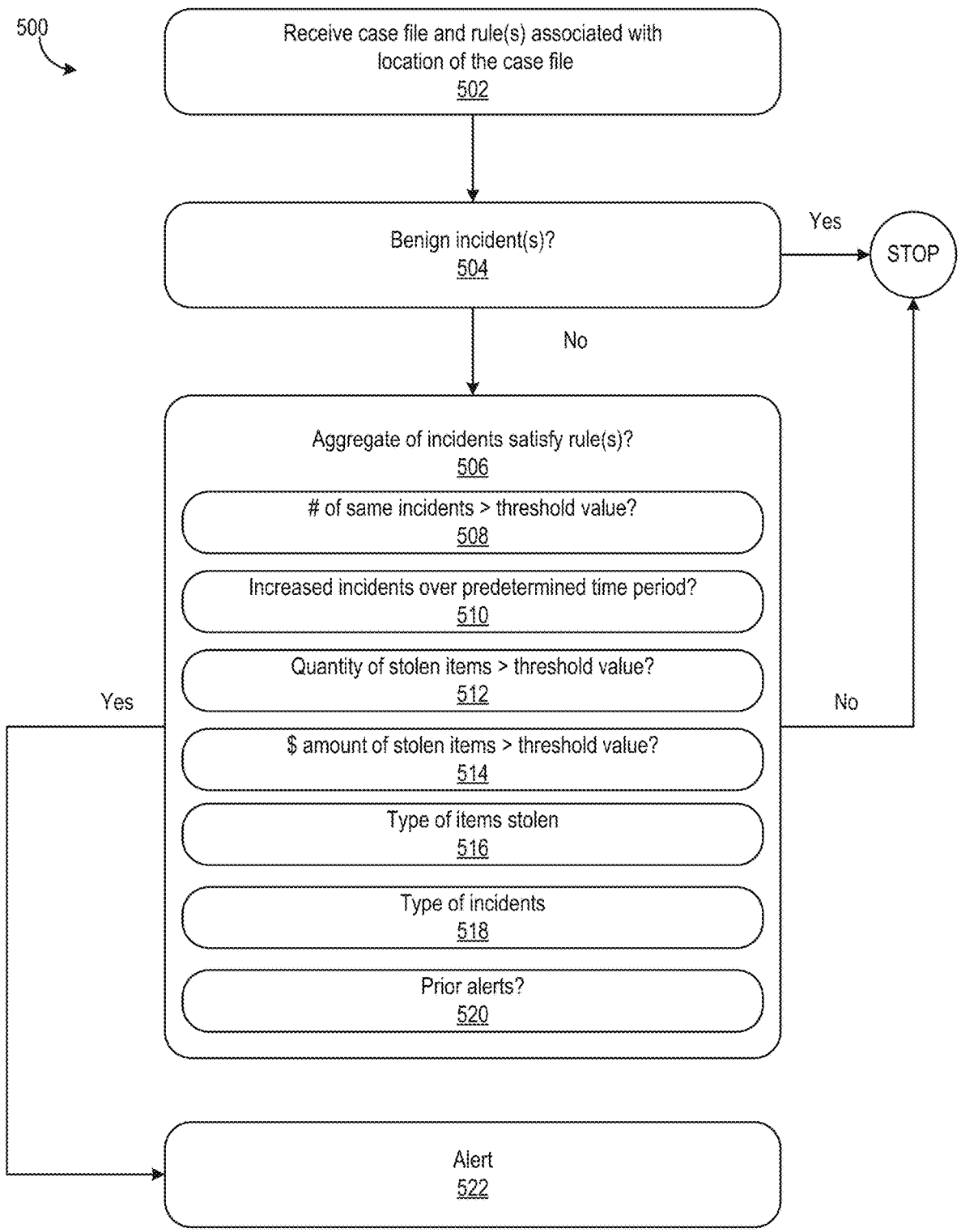
FIG. 5 is a flowchart of a process for determining whether to alert about an aggregate of identified security events associated with a shopper.

FIG. 5 is a flowchart of a process 500 for determining whether to alert about an aggregate of identified security events associated with a shopper. The process 500 can be performed any time after a case file is generated for the shopper and/or structured data is added to the case file. Moreover, the process 500 can be performed whenever a security event is identified and associated with the shopper. As described in reference to the process 400 in FIG. 4, the process 500 can also be performed as part of determining whether an incident satisfies an alerting rule (e.g., refer to block 416 in FIG. 4). If, for example, the shopper is involved in several security events that arise to a certain threshold level of severity, then appropriate parties, such as safety and security personnel (e.g., in-store employees and/or law enforcement), can be alerted about the shopper. The process 500 can be performed by the computer system 102. The process 500 can also be performed by one or more other computing systems, servers, devices, or network of computing devices. For illustrative purposes, the process 500 is described from a perspective of a computer system.

Referring to the process 500, the computer system can receive a case file and rule(s) associated with a location identified by the case file in 502. Refer to blocks 401-402 of the process 400 in FIG. 4.

The computer system can then determine whether one or more incidents documented in the case file are benign incidents in 504. As described in reference to FIG. 4 (e.g., refer to block 404 in FIG. 4), the computer system can determine whether the incidents satisfy severity threshold rules that are associated with the location of the case file. For example, the computer system can determine that the shopper is involved in a security event if only one of the incidents in the case file is not benign. For example, the computer system can determine that the shopper is involved in a security event if the case file includes at least a minimum predetermined quantity of incidents that are not identified as benign. For example, in a first location, the shopper may be involved in a security event if the case file includes one shoplifting incident in the past 10 days. In a second location, the shopper may be involved in a security even if the case file includes at least 5 shoplifting incidents over a predetermined period of time. As another example, the shopper may be involved in a security event if the case file includes several different types of incidents that are not benign (e.g., shoplifting, swapping barcodes, miss-scanning, sweethearting, physical contact with a customer or store employee, etc.).

If one or more of the incidents in the case file are benign in 504, then the process 500 can stop. If, on the other hand, one or more of the incidents are not benign, then the computer system can proceed to 506.

In 506, the computer system can determine whether the aggregate of incidents in the case file satisfy one or more alerting rules. As described in reference to FIG. 4, the alerting rules can be location specific. The rules can also be based on jurisdiction, state law, federal laws, store polices, and/or enterprise policies. As examples, the alerting rules can include determining whether a quantity of same incidents in the case file exceeds a threshold value (508).

The alerting rules can also include determining whether the shopper was involved in more incidents over a predetermined time period (510). Such alerting rules can be advantageous to determine whether the shopper was involved in a one-time incident (e.g., as a mistake or an accomplice) or whether the shopper has a predisposition to steal or get involved in other types of security incidents. As an illustrative example, in the first location, the aggregate of incidents can arise to an alerting level if the shopper engaged in at least a predetermined quantity of thefts over the past 10 days. As another illustrative example, in a second location, the aggregate of incidents can arise to an alerting level if the shopper continued to engage in incidents, whether benign or not, over a predetermined time period (such as a month or several months).

The alerting rules can include determining whether a quantity of stolen items in the aggregate exceeds a threshold value (512). Such alerting rules can also be advantageous to determine whether the shopper has a predisposition to steal from the store or other stores in the enterprise. As an illustrative example, in the first location, the aggregate of incidents can arise to an alerting level if the shopper stole a certain quantity of items over a predetermined time period, regardless of what type of items were stolen and/or how much such items cost. For example, the quantity of stolen items can be based on type of items stolen and/or cost of items stolen, as described in reference to FIG. 4 (e.g., refer to block 408 of the process 400 in FIG. 4).

The alerting rules can include determining whether a dollar amount of stolen items in the aggregate exceeds a threshold value (514). As an illustrative example, in the first location, the aggregate of incidents can arise to an alerting level if a total dollar amount of items stolen over a predetermined time period exceeds the threshold value. For example, if the shopper stole $1,000 worth of items over the course of 5 days, regardless of type and/or quantity of items stolen, the aggregate of incidents can be reported out. As another example, if the shopper stole $1,000 worth of items over the course of 30 days, regardless of type and/or quantity of items stolen, the aggregate of incidents may not be reported out.

The alerting rules can also be based on type of items stolen (516) and type of incidents (518), as described in reference to FIG. 4 (e.g., refer to blocks 412-414 of the process 400 in FIG. 4). Moreover, the alerting rules can be based on whether there were prior alerts about this particular shopper (520). For example, if prior alerts had been transmitted for the particular shopper, then the shopper is likely to be a security threat in the aggregate. As an illustrative example, in the first location, the aggregate of incidents can arise to an alerting level if a minimum amount of alerts had been made regarding the shopper over a predetermined time period. For example, if 5 alerts were reported to safety and security personnel for the particular shopper over 30 days, then the aggregate of incidents can arise to an alerting level. If, on the other hand, 5 alerts were reported to safety and security personnel for the particular shopper over 90 days, then the aggregate of incidents may not arise to an alerting level. More frequent alerts in a shorter timeframe can indicate that the particular shopper poses a more serious security threat to the store and/or a network of stores.

Refer to blocks 406-416 of the process 400 in FIG. 4 for further discussion about the alerting rules.

Still referring to the process 500 in FIG. 5, if the computer system determines that the aggregate of incidents satisfies one or more or any of the alerting rules in 506-520, then the computer system can alert appropriate parties in 522. The computer system can alert the parties as described throughout this disclosure. For example, the alert can include structured data from each of the incidents that are identified as security events. For example, the alert can include the entire case file associated with the particular shopper. For example, the alert can include and/or be based on prior alerts that were generated for the particular shopper.

If the computer system determines that the aggregate of incidents does not satisfy one or more or any of the alerting rules, then the process 500 can stop. At this point, the computer system can determine that the shopper does not pose a security threat and/or the aggregate of incidents does not amount to a severity level that warrants reporting out to safety and security personnel. As described throughout this disclosure, additional data can be added to the case file over time. Over time, the case file can also be assessed again to determine whether the aggregate of incidents in the case file satisfy the alerting rule(s).

Figure 6:
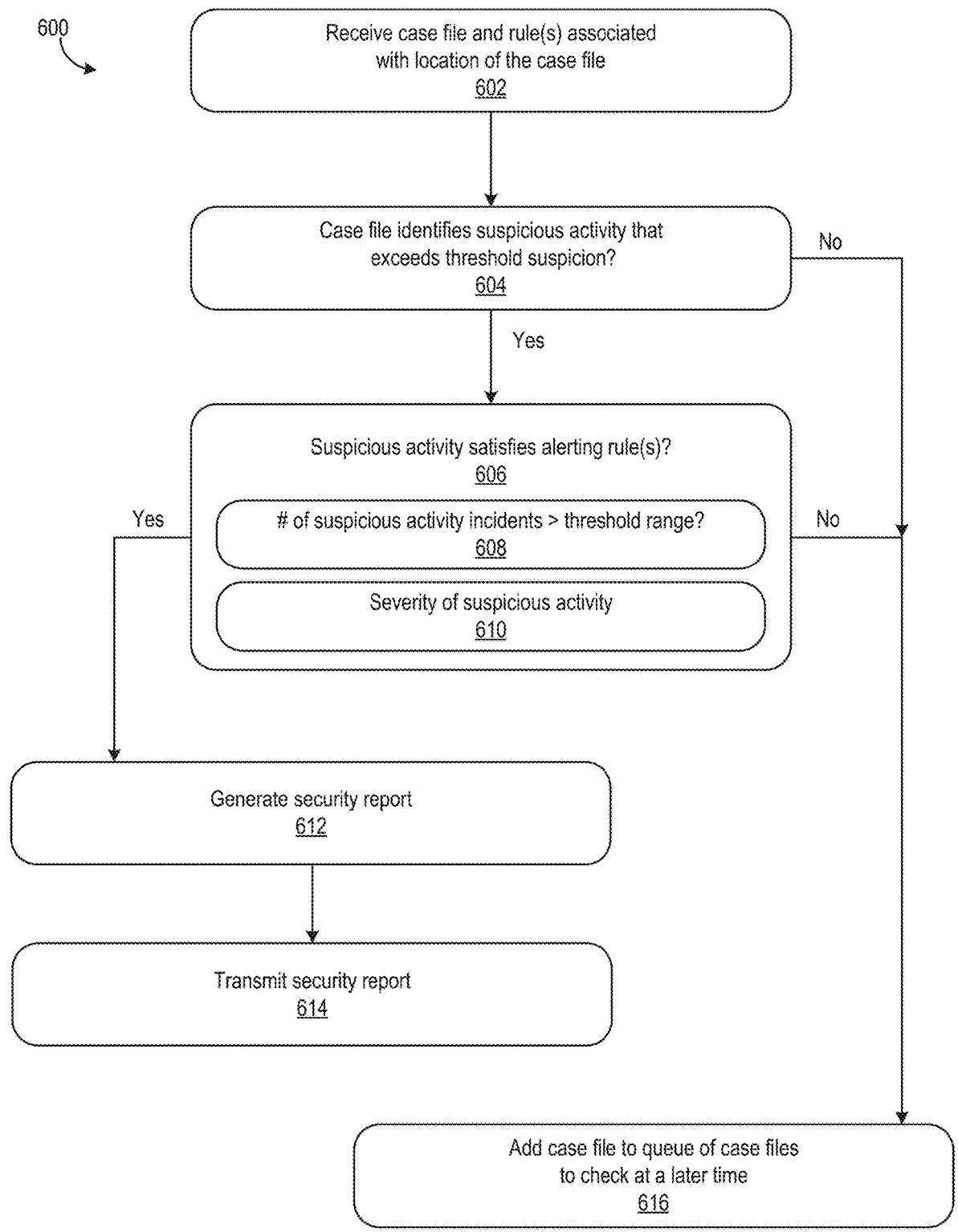
FIG. 6 is a flowchart of a process for determining whether to alert safety and security personnel about a case file.

FIG. 6 is a flowchart of a process 600 for determining whether to alert safety and security personnel about a case file. The safety and security personnel can include law enforcement For example. For example, the case file can include security incidents that may not warrant reporting out at a current time (e.g., because the security incidents do not meet a threshold level of severity) but may require reporting out at a later time. For example, for example, safety and security personnel may not respond to certain types of security incidents. In implementations where safety and security personnel may respond, the process 600 can be used to generate an appropriate report of the security incident(s). The process 600 can be performed by the computer system 102. The process 600 can also be performed by one or more other computing systems, servers, devices, or network of computing devices. For illustrative purposes, the process 600 is described from a perspective of a computer system.

Referring to the process 600, the computer system can receive a case file and rule(s) associated with a location of the case file in 602. Refer to blocks 401-402 of the process 400 in FIG. 4 and block 502 of the process 500 in FIG. 5 for further discussion.

The computer system can determine whether the case file identifies suspicious activity that exceeds a threshold suspicion level in 604. For example, the computer system can apply one or more of the rules associated with the location of the case file to make this determination. As mentioned throughout, each location can have a different threshold suspicion level. Each location can also have different rules/factors to determine whether the case file identifies activity that exceeds the threshold suspicion level. As an illustrative example, in a first location, the case file may not identify suspicious activity that exceeds the threshold suspicion level if the case file includes a certain quantity of thefts that involved a maximum price per stolen item. For example, if the case file identifies that a shopper stole 5 toothbrushes, totaling $10 of stolen items, the computer system can determine that the case file does not meet the threshold suspicion level. On the other hand, if the case file identifies that a shopper stole 1 TV and headphones, totally $1,500 of stolen items, the computer system can determine that the case file does meet the threshold suspicion level. Thus, quantity, type, and dollar amount of items stolen can raise a threshold suspicion and severity of the case file.

If the case file does not exceed the threshold suspicion level in 604, then the computer system can add the case file to a queue of case files to check at a later time (616). In other words, at a current time, the case file may not warrant alerting safety and security personnel, however at a later time, safety and security personnel may be alerted. Safety and security personnel can be alerted at the later time if additional data is added to the case file that raises a suspicion level and severity associated with the case file (e.g., the shopper engages in additional shoplifting, which is documented as security events in the shopper's case file).

If the case files does exceed the threshold suspicion level in 604, then the computer system can determine whether the suspicious activity in the case file satisfies one or more alerting rules in 606. In other words, the computer system can determine whether safety and security personnel would in fact respond to the suspicious activity in the case file. For example, safety and security personnel may not respond to petty theft where the shopper routinely steals packs of gum every day over a certain time period. On the other hand, as another example, safety and security personnel may respond when the shopper steals multiple TVs over a short time period since the shopper is frequently shoplifting and is stealing expensive merchandise.

Refer to blocks 406-416 of the process 400 in FIG. 4 and blocks 506-520 of the process 500 in FIG. 5 for further discussion about satisfying one or more alerting rules. For example, the computer system can determine whether a quantity of suspicious activity incidents in the case file exceeds a threshold range (608). Thus, if the shopper was involved in 10 suspicious activity incidents in only 15 days, the computer system may determine that one or more alerting rules are satisfied and the shopper poses a significant security threat. As another example, the computer system can determine a severity of the suspicious activity in the case file (610). Thus, regardless of how many suspicious activity incidents are in the case file, if the computer system identifies that one or more of the incidents meet a certain severity threshold (e.g., battery and/or assault are involved in the incident(s)), then the computer system can determine that the suspicious activity satisfies one or more alerting rules.

If the computer system determines that one or more or any of the alerting rules are satisfied, the computer system can generate a security report in 612. The computer system can then transmit the report to the appropriate parties in 614. As described herein, the report can include portions of or the entire case file. The report can be automatically populated with necessary information that safety and security personnel can use to objectively and unbiasedly identify and/or stop the shopper. For example, the report can include one or more objective identifiers associated with the shopper, such as a credit card number, mobile device MAC address, drivers license number, license plate number, etc. The report can also include portions of the structured data that are labeled and classified as security events. Using this information, safety and security personnel can get a better understanding of what the shopper did, such as swapping barcodes, scanning only some items at a POS checkout lane but not others, etc. Thus, the report can provide a robust and accurate analysis of the security event(s) associated with the particular shopper.

The report can be more accurate than reports that may be generated by store employees. This is because the store employees may not recollect accurate observations about the security event(s) some time after the event(s) occurred. Reports generated by the store employees may include biased or subjective observations, such as skin color, race, disabilities, etc. This information may be improperly used by safety and security personnel or other appropriate parties to identify and/or stop the shopper. For example, safety and security personnel may use human-made reports to profile shoppers. Safety and security personnel may identify and stop the wrong person by relying on biased and potentially erroneous human-made observations. The reports generated by the computer system as described herein can, on the other hand, be robust and accurate, such that safety and security personnel can identify and stop the right shopper without being biased or subjective.

Still referring to the process 600 in FIG. 6, if the computer system determines that the suspicious activity in the case file does not satisfy one or more or any of the alerting rules in 606-610, then the computer system can add the case file to a queue of case files to check at a later time, as described herein (616).

Figure 7A:
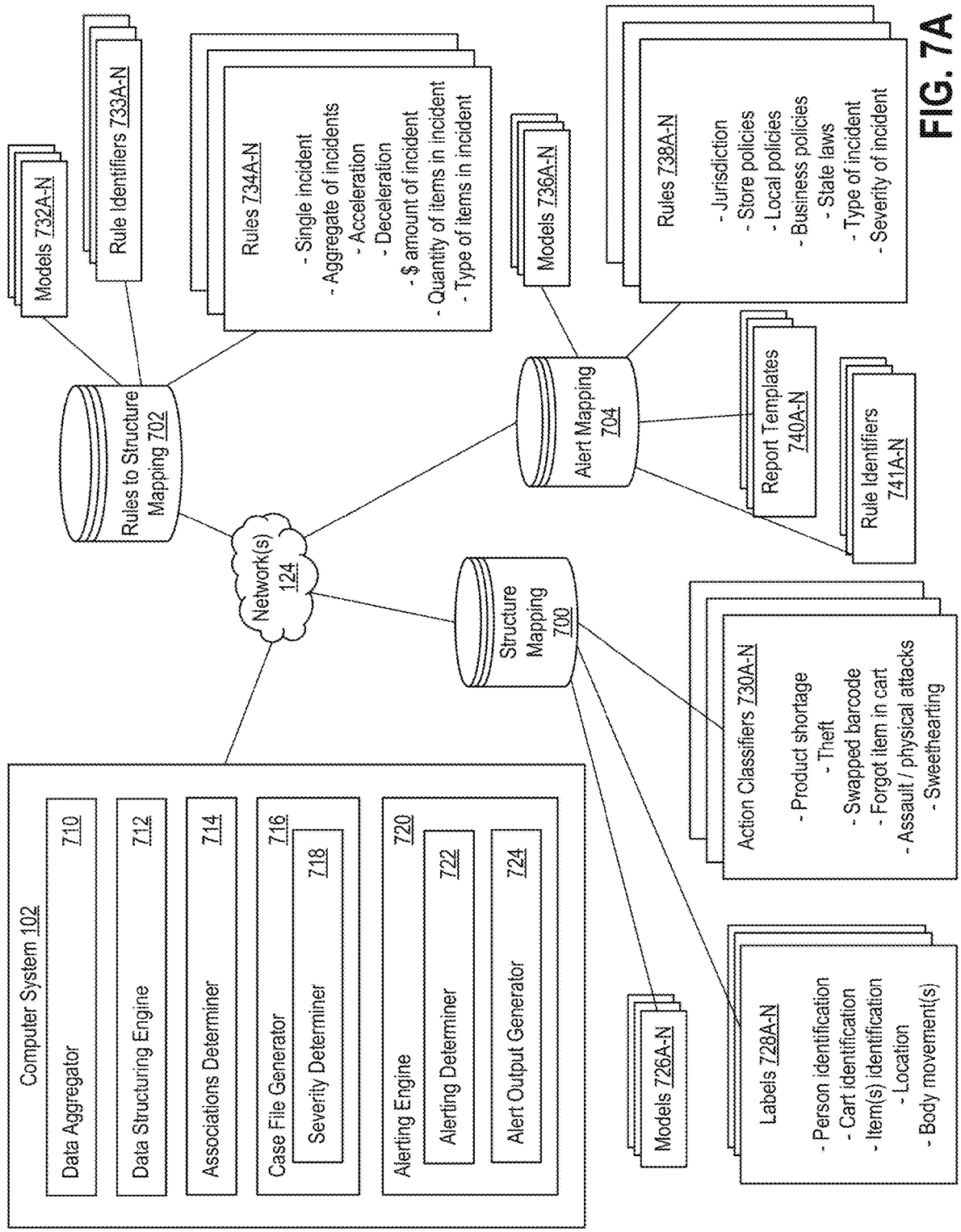
FIGS. 7A-B are system diagrams of components that can be used to perform the disclosed techniques.
Figure 7B:
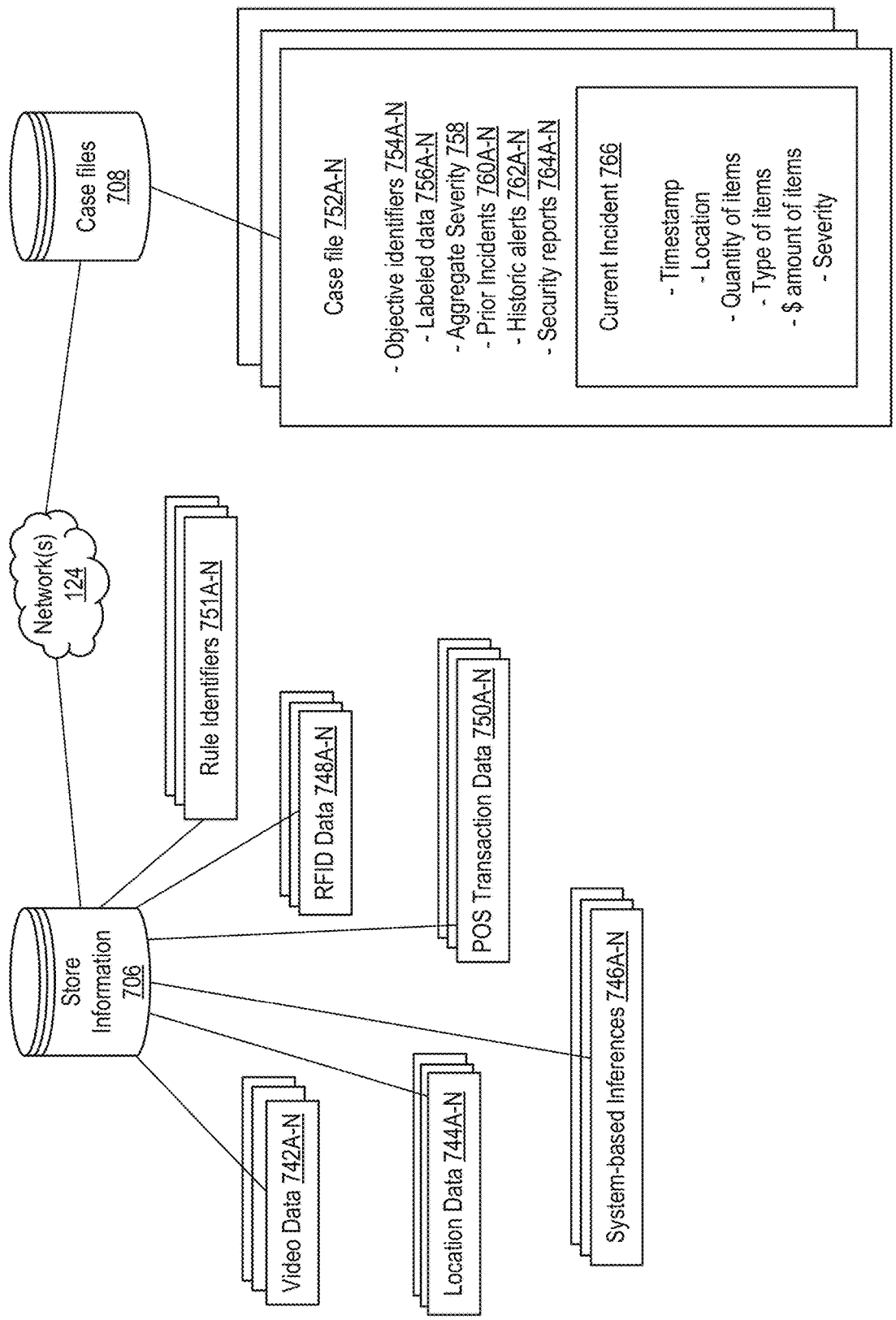

FIGS. 7A-B are system diagrams of components that can be used to perform the disclosed techniques. As described herein, the computer system 102 can communicate with one or more data stores via network(s) 124. One or more of the data stores can be databases, computers, servers, cloud storage, or other types of devices used for storing information. For example, one or more of the data stores depicted and described herein can be integrated into or otherwise combined into fewer data stores.

Referring to the system components depicted in both FIGS. 7A-B, the computer system 102, structure mapping data store 700, rules to structure mapping data store 702, alert mapping data store 704, store information data store 706, and case files data store 708 can communicate via the network(s) 124.

The computer system 102 can include one or more components to perform the techniques described herein. For example, the computer system 102 can include a data aggregator 710, a data structuring engine 712, an associations determine 714, a case file generator 716, and an alerting engine 720.

The data aggregator 710 can be configured to compile unstructured data as well as system-based inferences that are received from one or more devices and/or systems in a store (e.g., refer to step D in FIG. 1). For example, the aggregator 710 can retrieve information from the store information data store 706. For example, the aggregator 710 can retrieve one or more video data 742A-N, location data 744A-N, system-based inferences 746A-N, RFID data 748A-N, POS transaction data 750A-N, and/or rule identifiers 751A-N. sometimes, the data 742A-N, 744A-N, 746A-N, 748A-N, and 750A-N can be sent from devices and/or systems in the store to the store information data store 706 instead of and/or in addition to the computer system 102. For example, the computer system 102 can receive the data 742A-N, 744A-N, 746A-N, 748A-N, and 750A-N and transmit the data to the store information data store 706 for storage. Moreover, the rule identifiers 751A-N can be used to determine how to aggregate the data and/or which models to use to add structure to the data.

The data structuring engine 712 can be configured to add structure to the unstructured data and system-based inferences, as described throughout this disclosure. For example, the data structuring engine 712 can retrieve one or more structuring models 726A-N from the structure mapping data store 700. Using those models, the data structuring engine 712 can add structure to the data that was aggregate by the data aggregator 710.

Moreover, the engine 712 can retrieve one or more labels 728A-N, and/or one or more action classifiers 730A-N from the structure mapping data store 700. Using the labels 728A-N and action classifiers 730A-N, the engine 712 can identify structured data that may indicate suspicious activity, such as barcode swapping, mismatched labels, and shoplifting.

The labels 728A-N can include person identification, cart identification, item(s) identification, location, and/or body movement(s). One or more other labels 728A-N can also be generated and used with the models 726A-N to add structure to the data. For example, the engine 712 can identify in a video feed, body movement(s) that suggest a shopper is swapping a barcode on an item. The engine can label the video feed with labels 728A-N that correspond to such body movement(s), item, and/or action(s).

The action classifiers 730A-N can include product shortage, theft, swapped barcode, forgot item in cast, assault/physical attacks, and/or sweethearting. One or more other classifiers 730A-N can also be generated and used with the models 726A-N to add structure to the data. For example, the engine 712 can label a video feed with body movement(s) that indicate a shopper is swapping a barcode on an item. Accordingly, the engine 712 can classify this labeled video feed into one or more categories, such as theft and/or swapped barcode. As another example, the engine 712 can label POS transaction data with item identification(s) and mismatched barcode(s). Accordingly, the engine 712 can classify this labeled POS transaction data into one or more categories, such as theft, swapped barcode, and/or sweethearting.

The associations determiner 714 can be configured to make associations between/amongst the labeled and classified data (e.g., refer to step E in FIG. 1). For example, the determiner 714 can receive the labeled and classified data from the data structuring engine 712. The associations determiner 714 can also retrieve one or more models 726A-N from the structure mapping data store 700. Using the models 726A-N, the associations determiner 714 can link one or more of the labeled and classified data. As a result, the associations determiner 714 can generate a story depicting a timeline of events associated with one or more suspicious activities.

The case file generator 716 can be configured to generate case files for different shoppers. As described herein, the case files can be robust and accurate collections of structured and associated data. The case files can also include objective identifiers that can be used to identify particular shoppers. For example, a case file can be generated per security event that is identified. For example, a case file can be generated per shopper, and each security event that is identified can be added to that shopper's case file.

The case file generator 716 can include a severity determiner 718. The severity determiner 718 can be configured to, using the techniques described herein, determine whether the associated data amounts to security events or whether the associated data amounts to benign incidents (e.g., refer to FIGS. 4-6). For example, the case file generator 716 can access one or more models 732A-N, rule identifiers 733A-N, and/or rules 734A-N from the rules to structure mapping data store 702. Using this information, the case file generator 716 can determine whether the associated data is benign or a security incident. The models 732A-N can be trained to assess a severity of the associated data. The rule identifiers 733A-N can be used by the severity determiner 718 to determine which of the rules 734A-N to apply to the associated data. As mentioned throughout, a location can be linked to the associated data. That location can a rule identifier 733A-N, which can be used to select which of the rules 734A-N to apply. The rules 734A-N can be associated with one or more difference geographic areas/regions, jurisdictions, state laws, local laws, federal laws, store policies, and/or enterprise policies. Example rules 734A-N for the different locations can assess severity based on a single incident, aggregate of incidents, acceleration of incidents, deceleration of incidents, dollar amount involved in an incident or incidents, quantity of items involved in an incident or incidents, and/or type of items in an incident or incidents. One or more other rules 734A-N can be stored in the rules to structure mapping data store 702 and used by the severity determiner 718, as described throughout this disclosure.

Once the case file generator 716 generates case files, the case files can be stored in the case files data store 708. The case files data store 708 can store a plurality of case files 752A-N. Each of the case files 752A-N can include information such as objective identifiers 754A-N, labeled data 756A-N, aggregate severity 758, prior incidents 760A-N, historic alerts 762A-N, security reports 764A-N, and a current incident 766. The current incident 766 can further include information such as a timestamp, location of the incident, quantity of items involved in the incident, type of items involved in the incident, dollar amount of the items involved in the incident, and/or severity of the incident.

The alerting engine 720 can be configured to determine when to alert appropriate parties about a security event or a case file, generate the alert, and report the alert out to the appropriate parties. Thus, the alerting engine 720 can include an alerting determiner 722 and an alert output generator 724. The alerting determiner 722 can identify when a security event or case file reaches a threshold severity level that warrants reporting out to safety and security personnel.

The alerting determiner 722 can retrieve one or more models 736A-N, rule identifiers 741A-N, and/or rules 738A-N from the alert mapping data store 704. The models 736A-N can be trained to identify when the security event or case file warrants alerting based on the rules 738A-N, as described herein. The rule identifiers 741A-N can be used by the alerting determiner 722 to determine which of the rules 738A-N to apply. As mentioned throughout, which alerting rules to apply can change based on location of the security event or case file, jurisdiction, state law, federal law, local law, store policies, and/or enterprise policies. The alerting rules 738A-N can also be based on jurisdiction, store policies, local policies, business policies, state laws, type of incident, and/or severity of incident, as described further throughout this disclosure.

If the alerting determiner 722 determines that the security event or case file should be reported out, the alert output generator 724 can generate an appropriate report and transmit the report to the appropriate parties. For example, the alert output generator 724 can retrieve report templates 740A-N from the alert mapping data store 704. The report templates 740A-N can identify information that should be included in the report based on severity of the incident, type of the incident, and/or local polices and other factors. Once the generator 724 selects the appropriate report template from the templates 740A-N, a security report can be automatically populated with the necessary information for reporting out. The alerting engine 720 can then transmit the security report to the appropriate parties. For example, the alert output generator 724 can also retrieve one or more historic alerts 762A-N and/or security reports 764A-N in the case file 752A-N associated with the shopper. The generator 724 can use the historic alerts 762A-N and/or reports 746A-N to generate a security report for the current incident. The generated security report can then be stored in the corresponding case file 752A-N in the case files data store 708.

Figure 8:
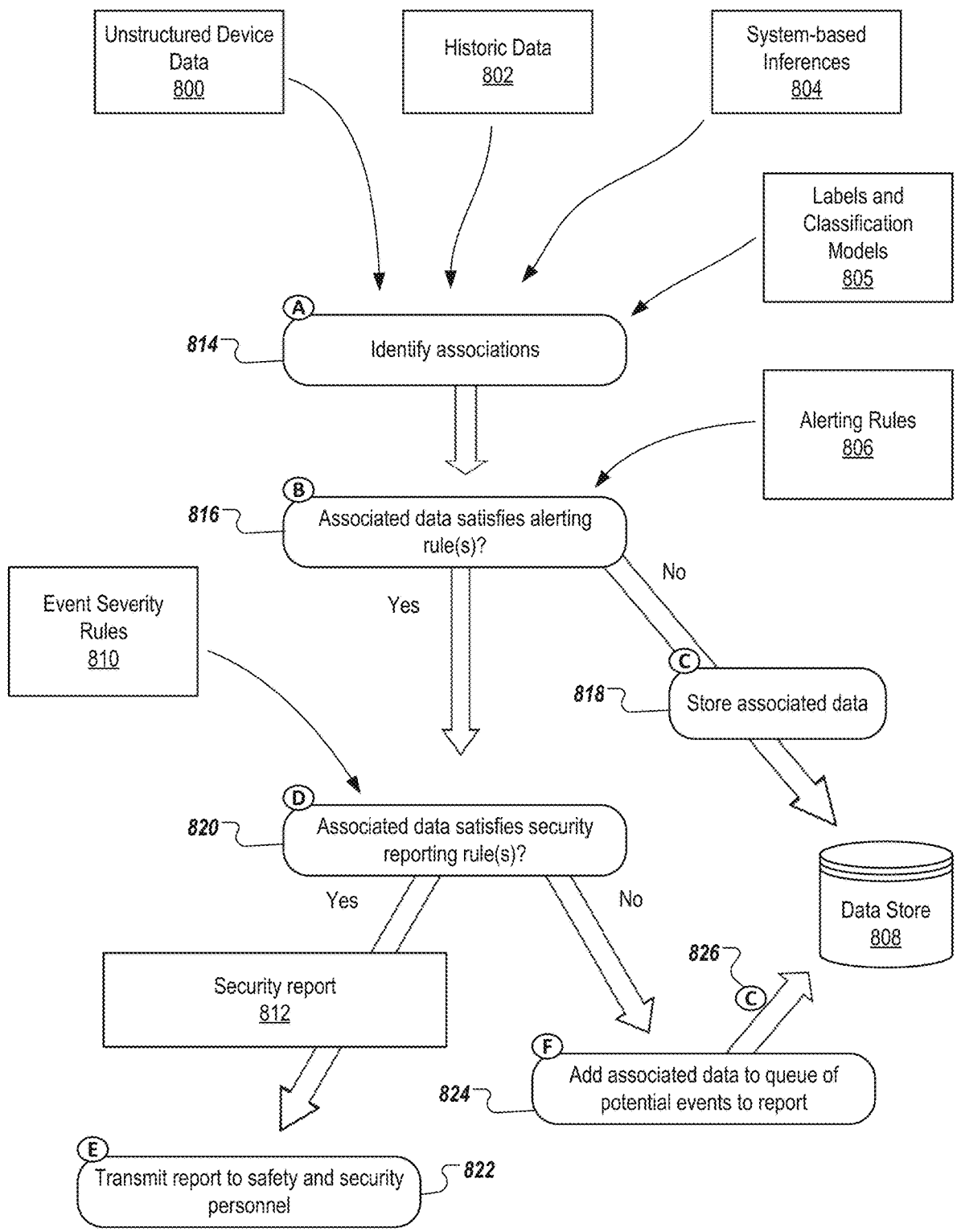
FIG. 8 is a block diagram of identifying security events using the disclosed techniques.

FIG. 8 is a block diagram of identifying security events using the disclosed techniques. As described herein, a computer system (e.g., the computer system 102) can identify associations amongst unstructured device data 800, historic data 802, and system-based inferences 804 (step A, 814). The computer system can use one or more labels and classification models 805 in order to make such associations. Refer to steps D-F in FIG. 1, blocks 202-212 in FIG. 2, and blocks 314-326 in FIGS. 3A-B.

The computer system can then determine whether the associated data satisfies one or more alerting rules (step B, 816). The computer system can use one or more alerting rules 806 that are specific to a location of the associated data to make such a determination. Refer to step I in FIG. 1, block 214 in FIG. 2, blocks 328-332 in FIG. 3B, blocks 404-416 in FIG. 4, blocks 504-520 in FIG. 5, and blocks 604-610 in FIG. 6.

If the associated data does not satisfy alerting rules, the computer system can store the associated data in a data store 808 (step C, 818).

If the associated data does satisfy alerting rules, then the computer system can determine whether the associated data satisfies one or more reporting rule(s) (step D, 820). The computer system can use one or more event security rules 810 that are specific to the location of the associated data to make such a determination. Refer to block 218 in FIG. 2, blocks 406-416 in FIG. 4, blocks 506-520 in FIG. 5, and blocks 606-610 in FIG. 6.

If the associated data does satisfy reporting rules, the computer system can generate a security report 812 and transmit the report to the appropriate safety and security personnel (step E, 822). Refer to step I in FIG. 1, blocks 218-220 in FIG. 2, block 418 in FIG. 4, block 522 in FIG. 5, and blocks 612-614 in FIG. 6.

If the associated data does not satisfy reporting rules, the computer system can add the associated data to a queue of potential events to report (step F, 824). Refer to block 616 in FIG. 6. The computer system can then store the associated data in the data store (step C, 826). Refer to block 216 in FIG. 2, block 332 in FIG. 3, and block 420 in FIG. 4.

Figure 9:
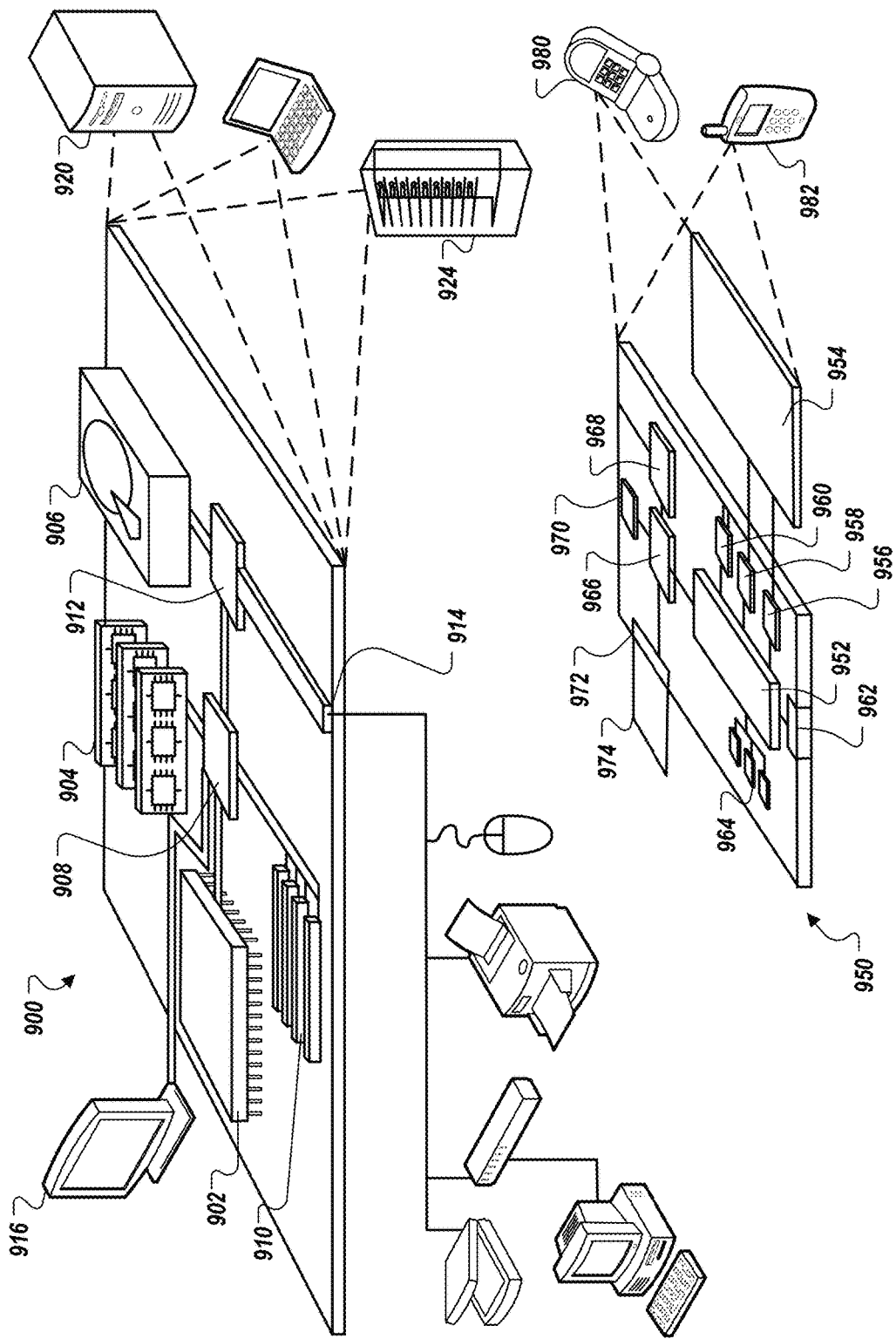
FIG. 9 is a schematic diagram that shows an example of a computing device and a mobile computing device.

FIG. 9 shows an example of a computing device 900 and an example of a mobile computing device that can be used to implement the techniques described here. The computing device 900 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 900 includes a processor 902, a memory 904, a storage device 906, a high-speed interface 908 connecting to the memory 904 and multiple high-speed expansion ports 910, and a low-speed interface 912 connecting to a low-speed expansion port 914 and the storage device 906. Each of the processor 902, the memory 904, the storage device 906, the high-speed interface 908, the high-speed expansion ports 910, and the low-speed interface 912, are interconnected using various busses, and can be mounted on a common motherboard or in other manners as appropriate. The processor 902 can process instructions for execution within the computing device 900, including instructions stored in the memory 904 or on the storage device 906 to display graphical information for a GUI on an external input/output device, such as a display 916 coupled to the high-speed interface 908. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 904 stores information within the computing device 900. For example, the memory 904 is a volatile memory unit or units. For example, the memory 904 is a non-volatile memory unit or units. The memory 904 can also be another form of computer-readable medium, such as a magnetic or optical disk.

The storage device 906 is capable of providing mass storage for the computing device 900. For example, the storage device 906 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 904, the storage device 906, or memory on the processor 902.

The high-speed interface 908 manages bandwidth-intensive operations for the computing device 900, while the low-speed interface 912 manages lower bandwidth-intensive operations. Such allocation of functions is exemplary only. For example, the high-speed interface 908 is coupled to the memory 904, the display 916 (e.g., through a graphics processor or accelerator), and to the high-speed expansion ports 910, which can accept various expansion cards (not shown). In the implementation, the low-speed interface 912 is coupled to the storage device 906 and the low-speed expansion port 914. The low-speed expansion port 914, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 900 can be implemented in a number of different forms, as shown in the figure. For example, it can be implemented as a standard server 920, or multiple times in a group of such servers. In addition, it can be implemented in a personal computer such as a laptop computer 922. It can also be implemented as part of a rack server system 924. Alternatively, components from the computing device 900 can be combined with other components in a mobile device (not shown), such as a mobile computing device 950. Each of such devices can contain one or more of the computing device 900 and the mobile computing device 950, and an entire system can be made up of multiple computing devices communicating with each other.

The mobile computing device 950 includes a processor 952, a memory 964, an input/output device such as a display 954, a communication interface 966, and a transceiver 968, among other components. The mobile computing device 950 can also be provided with a storage device, such as a micro-drive or other device, to provide additional storage. Each of the processor 952, the memory 964, the display 954, the communication interface 966, and the transceiver 968, are interconnected using various buses, and several of the components can be mounted on a common motherboard or in other manners as appropriate.

The processor 952 can execute instructions within the mobile computing device 950, including instructions stored in the memory 964. The processor 952 can be implemented as a chipset of chips that include separate and multiple analog and digital processors. The processor 952 can provide, for example, for coordination of the other components of the mobile computing device 950, such as control of user interfaces, applications run by the mobile computing device 950, and wireless communication by the mobile computing device 950.

The processor 952 can communicate with a user through a control interface 958 and a display interface 956 coupled to the display 954. The display 954 can be, for example, a TFT (Thin-Film-Transistor Liquid Crystal Display) display or an OLED (Organic Light Emitting Diode) display, or other appropriate display technology. The display interface 956 can comprise appropriate circuitry for driving the display 954 to present graphical and other information to a user. The control interface 958 can receive commands from a user and convert them for submission to the processor 952. In addition, an external interface 962 can provide communication with the processor 952, so as to enable near area communication of the mobile computing device 950 with other devices. The external interface 962 can provide, for example, for wired communication For example, or for wireless communication in other implementations, and multiple interfaces can also be used.

The memory 964 stores information within the mobile computing device 950. The memory 964 can be implemented as one or more of a computer-readable medium or media, a volatile memory unit or units, or a non-volatile memory unit or units. An expansion memory 974 can also be provided and connected to the mobile computing device 950 through an expansion interface 972, which can include, for example, a SIMM (Single In Line Memory Module) card interface. The expansion memory 974 can provide extra storage space for the mobile computing device 950, or can also store applications or other information for the mobile computing device 950. Specifically, the expansion memory 974 can include instructions to carry out or supplement the processes described above, and can include secure information also. Thus, for example, the expansion memory 974 can be provide as a security module for the mobile computing device 950, and can be programmed with instructions that permit secure use of the mobile computing device 950. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. For example, a computer program product is tangibly embodied in an information carrier. The computer program product contains instructions that, when executed, perform one or more methods, such as those described above. The computer program product can be a computer- or machine-readable medium, such as the memory 964, the expansion memory 974, or memory on the processor 952. For example, the computer program product can be received in a propagated signal, for example, over the transceiver 968 or the external interface 962.

The mobile computing device 950 can communicate wirelessly through the communication interface 966, which can include digital signal processing circuitry where necessary. The communication interface 966 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 968 using a radio-frequency. In addition, short-range communication can occur, such as using a Bluetooth, WiFi, or other such transceiver (not shown). In addition, a GPS (Global Positioning System) receiver module 970 can provide additional navigation- and location-related wireless data to the mobile computing device 950, which can be used as appropriate by applications running on the mobile computing device 950.

The mobile computing device 950 can also communicate audibly using an audio codec 960, which can receive spoken information from a user and convert it to usable digital information. The audio codec 960 can likewise generate audible sound for a user, such as through a speaker, e.g., in a handset of the mobile computing device 950. Such sound can include sound from voice telephone calls, can include recorded sound (e.g., voice messages, music files, etc.) and can also include sound generated by applications operating on the mobile computing device 950.

The mobile computing device 950 can be implemented in a number of different forms, as shown in the figure. For example, it can be implemented as a cellular telephone 980. It can also be implemented as part of a smart-phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

FIG. 10 is a flowchart of an example process 1000 for determining whether to intervene when suspicious activity is inferred during a transaction. Therefore, the process 1000 provides for performing some form of real-time intervention during a transaction, before a shopper completes a transaction and leaves a store environment. The process 1000 can be performed by the computer system 102, as described throughout this disclosure. The process 1000 can also be performed by any of the POS terminals 106A-N and/or any other devices, systems, computers, cloud-based services, and/or networks of computers or devices. For illustrative purposes, the process 1000 is described from a perspective of a computer system.

Referring to the process 1000, the computer system receives a determined intervention in 1002. The intervention can be determined by the POS terminal 106A, as described in blocks 308-309 in FIG. 3A. For example, and as described in FIGS. 3A-B, the shopper can scan items during checkout at the POS terminal 106A. The POS terminal 106A can determine a scan mismatch and infer suspicious activity, such as shoplifting or ticket swapping. The POS terminal 106A can then determine that an intervention may be warranted in real-time, before the shopper leaves the store. In some implementations, the computer system can receive a notification from the POS terminal 106A that some intervention should be performed in 1002. In some implementations, the computer system can receive an indication of a particular type of information that should be performed in 1002.

Once the computer system receives the determined intervention (e.g., a notification to perform some intervention or an indication of a type of intervention to perform), the computer system can transmit a prompt about the inferred suspicious activity to the shopper at the POS terminal 106A (1004). The prompt can be outputted at a display of the POS terminal 106A and can indicate that the shopper should rescan the item that the POS terminal 106A identified as a mismatch. In another example, the prompt can indicate that it appears that the shopper is shoplifting, ticket swapping, or performing some other suspicious activity. Sometimes, the prompt can indicate that the shopper cannot continue scanning items or completing the checkout process. Thus, the shopper may be prevented from completing checkout and leaving the store. As yet another example, the prompt can require the shopper to scan their ID, such as a government-issued identification card/ID. The computer system can then use the shopper's ID as an objective identifier to associate the shopper with a case file. The computer system may also use the shopper's ID as an objective identifier to tie the inferred suspicious activity to other transaction history associated with this shopper. As a result, the computer system can determine whether the shopper is actually engaging in suspicious activity that warrants real-time intervention.

The computer system determines whether the shopper responds to the prompt within a predetermined period of time in 1006. The predetermined period of time can be any reasonable amount of time, such as 30 seconds, 1 and a half minutes, 2 minutes, 2 and a half minutes, etc. The shopper can respond to the prompt by scanning their ID. The shopper can also respond to the prompt by rescanning the item that was identified as a mismatch by the POS terminal 106A. In some implementations, the shopper can also respond by not continuing to scan other items. The shopper can also respond by not completing the transaction and/or not providing payment to the POS terminal 106A. The shopper's response can be provided as user input to the POS terminal 106A and transmitted to the computer system.

If the shopper does respond to the prompt within the predetermined period of time, then the computer system can store the shopper's response with an associated case file in 1008. For example, the computer system can search a data store of case files to determine which, if any, of the case files contain the shopper's ID. The computer system can also use one or more other objective identifiers described herein to match the shopper's response with a case file in the data store. If the shopper is not associated with any case file, then in some implementations, the computer system can generate a new case file with the inferred suspicious activity and other associated data.

The computer system can then add the case file to a queue of case files to be checked at a later time (1010). Thus, since the shopper responded to the prompt within the predetermined period of time in 1006, the shopper may not pose a significant enough threat to warrant real-time intervention during the checkout process and before the shopper leaves the store. Instead, the shopper's suspicious activity can merely be stored in a case file and assessed at a later time to determine whether the shopper poses a threat to the store environment or other stores in a same geographic region.

Referring back to 1006, if the computer system determines that the shopper did not respond to the prompt within the predetermined period of time, the computer system can generate an alert and transmit the alert in 1012. The shopper may not respond to the prompt if the shopper does not scan their ID, they continue to scan items, they provide payment information to the POS terminal 106A, they leave the POS terminal 106A to exit the store environment, etc. The alert can be transmitted to safety and security personnel. The safety and security personnel can then intervene by preventing the shopper from completing the checkout process and/or leaving the store environment. For example, the POS terminal 106A can be automatically locked (e.g., by the computer system or the safety and security personnel) such that the shopper cannot scan any more items or provide payment information. As another example, safety and security personnel can approach the shopper at the POS terminal 106A and perform safety and security protocol or other policies associated with the store environment. As a result, intervention can be performed in real-time to prevent the shopper from completing the checkout process and/or leaving the store environment after performing some suspicious activity.

Once the safety and security personnel are alerted in 1012, the computer system can return to the process 300 described in FIGS. 3A-B at block 314, where the computer system receives transaction data. The computer system can then proceed with blocks 314-332 in the process 300 to classify the suspicious activity as a security event and/or to generate a case file for the particular shopper (e.g., refer to FIGS. 3A-B).

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for generating security event case files with unstructured data, the method comprising:
  receiving, by a computing system, unstructured data and system-based inferences, wherein the unstructured data comprises raw data that is captured by one or more devices positioned throughout a store and the system-based inferences comprise data indicating potentially suspicious activities in the store that is generated by the one or more devices in response to processing the unstructured data;
  retrieving, by the computing system and from a data store, one or more structuring models, wherein the one or more structuring models were trained using machine learning to process the unstructured data and the system-based inferences by automatically (i) adding information to the unstructured data and the system-based inferences to generate structured data, the added information defining one or more security event characteristics associated with the unstructured data and the system-based inferences, and (ii) correlating the unstructured data and the system-based inferences based on the respective added information to identify suspicious activities in the store;
  adding structure, by the computing system, to the unstructured data and the system-based inferences based on applying the one or more structuring models, wherein adding structure using the one or more structuring models comprises:
    labeling, by the computing system, the unstructured data and the system-based inferences, classifying, by the computing system, the labeled data and system-based inferences into one or more of the plurality of security event categories, wherein the plurality of security event categories identify suspicious activities that may occur in the store, and identifying, by the computing system, objective identifiers from the structured data and the structured system-based inferences, wherein the objective identifiers identify one or more users that appear in the structured data and the structured system-based inferences;

generating, by the computing system, a case file for each of the one or more objective identifiers, wherein the case file includes the structured data and the structured system-based inferences that correspond to the respective objective identifier;

determining, by the computing system, whether information in the case file satisfies one or more alerting rules, wherein the one or more alerting rules correspond to alerting policies for a location in the store that is identified by location information in the case file; and storing, by the computing system and in the data store, the case file with the determination of whether the information in the case file satisfies the one or more alerting rules.

2. The method of claim 1, wherein the unstructured data includes video data, image data, location signals, RFID readings, and point of sale (POS) transaction data.

3. The method of claim 1, wherein the one or more devices positioned throughout the store include one or more cameras, RFID readers, location-based signaling devices, mobile devices, and POS terminal checkout lanes.

4. The method of claim 1, wherein the plurality of security event categories include shoplifting, sweethearting, swapping barcodes, miss-scan, forgotten item in cart, physical contact, assault, battery, felony, and crime.

5. The method of claim 1, wherein the one or more alerting rules are based on at least one of jurisdiction, state law, federal law, store policies, and enterprise polices.

6. The method of claim 1, wherein the objective identifiers are at least one of a credit card number, a driver's license number, a license plate, a customer number, and a MAC address.

7. The method of claim 1, further comprising:
generating, by the computing system and based on determining that the case file satisfies one or more of the alerting rules, a security report, wherein the security report includes at least one of (i) the case file, (ii) portions of the case file indicative of suspicious activity, (iii) an objective identifier associated with the case file, and (iv) a severity level of the suspicious activity in the case file; and transmitting, by the computing system, the security report to a device of safety and security personnel, wherein the security report is used to objectively monitor and stop the suspicious activity of a user identified by the objective identifier that is associated with the case file.

8. The method of claim 1, further comprising associating, by the computing system, the structured data and the structured system-based inferences based on:
assigning, for each of the structured data and the structured system-based inferences, a security event category of the plurality of security event categories;
determining whether a threshold amount of the structured data and the structured system-based inferences have the same (i) security event category, (ii) objective identifiers, and (iii) timestamps that are within a threshold timeframe; and linking, based on a determination that the structured data and the structured system-based inferences have the same security event category, the threshold amount of the structured data and the structured system-based inferences in a same case file.

9. The method of claim 8, further comprising:
determining, by the computing system, whether the linked data in the case file exceeds a suspicion threshold level, wherein the suspicion threshold level is based on the threshold amount of the structured data and the structured system-based inferences having the same security event category; and flagging, by the computing system, the case file based on a determination of whether the linked data exceeds the suspicion threshold level, wherein the computing system is configured to flag the case file as representing a security event that may require alerting safety and security personnel based on determining that the linked data exceeds the suspicion level, and wherein the computing system is configured to flag the case file as a benign incident that does not require alerting safety and security personnel based on determining that the linked data does not exceed the suspicion threshold level.

10. The method of claim 9, wherein determining, by the computing system, whether the case file satisfies one or more of the alerting rules comprises determining, based on the alerting policies for the location identified in the case file, at least one of:
whether a quantity of same security event categories in the case file exceeds a threshold quantity,
whether, over a predetermined period of time, at least a threshold quantity of linked data is flagged, by the computing system, as a security event,
whether a quantity of stolen items associated with the linked data exceeds a threshold value,
whether a dollar amount of the stolen items associated with the linked data exceeds a threshold value,
type of the stolen items that are associated with the linked data,
type of security event categories that each of the linked data is assigned, and
whether safety and security personnel was alerted about one or more preexisting security events in the case file.

11. The method of claim 1, wherein determining, by the computing system, whether the case file satisfies one or more of the alerting rules comprises determining, based on the alerting policies for the location identified in the case file, whether, in the aggregate, the data in the case file exceeds a severity threshold level.

12. The method of claim 1, further comprising adding, by the computing system, the case file to a queue of case files to check at a later time based on determining that the case file does not satisfy one or more of the alerting rules.

13. A system for generating security event case files with unstructured data, the system comprising:
one or more devices that include cameras, RFID readers, location-based signaling devices, mobile devices, and point of sale (POS) terminal checkout lanes, wherein the one or more devices are positioned throughout a store and configured to generate unstructured data and system-based inferences about activity in the store, wherein the unstructured data comprises raw data that is captured by the one or more devices and the system-based inferences comprise data indicating potentially suspicious activities in the store that is generated by the one or more devices in response to processing the unstructured data;

a data store; and a computing system in communication with the one or more devices and the data store, wherein the computing system is configured to:

receive the unstructured data and the system-based inferences from the one or more devices;

retrieve one or more structuring models from the data store, wherein the one or more structuring models were trained using machine learning to process the unstructured data and the system-based inferences by automatically (i) adding information to the unstructured data and the system-based inferences to generate structured data, the added information defining one or more security event characteristics associated with the unstructured data and the system-based inferences, and (ii) correlating the unstructured data and the system-based inferences based on the respective added information to identify suspicious activities in the store;

add structure to the unstructured data and the system-based inferences based on applying the one or more structuring models, wherein adding structure using the one or more structuring models comprises:

labeling the unstructured data and the system-based inferences, classifying the labeled data and system-based inferences into one or more of the plurality of security event categories, wherein the plurality of security event categories identify suspicious activities that may occur in the store, and identifying objective identifiers from the structured data and the structured system-based inferences, wherein the objective identifiers identify one or more users that appear in the structured data and the structured system-based inferences;

generate a case file for each of the one or more objective identifiers, wherein the case file includes the structured data and the structured system-based inferences that correspond to the respective objective identifier;

determine whether information in the case file satisfies one or more alerting rules, wherein the one or more alerting rules correspond to alerting policies for a location in the store that is identified by location information in the case file; and store, in the data store, the case file with the determination of whether the information in the case file satisfies the one or more alerting rules.

14. The system of claim 13, wherein the unstructured data includes video data, image data, location signals, RFID readings, and point of sale (POS) transaction data.

15. The system of claim 13, wherein the one or more devices include one or more cameras, RFID readers, location-based signaling devices, mobile devices, and POS terminal checkout lanes.

16. The system of claim 13, wherein the plurality of security event categories include shoplifting, sweethearting, swapping barcodes, miss-scan, forgotten item in cart, physical contact, assault, battery, felony, and crime.

17. The system of claim 13, wherein the one or more alerting rules are based on at least one of jurisdiction, state law, federal law, store policies, and enterprise polices.

18. The system of claim 13, wherein the objective identifiers are at least one of a credit card number, a driver's license number, a license plate, a customer number, and a MAC address.

19. The system of claim 13, wherein the computing system is further configured to:

generate, based on determining that the case file satisfies one or more of the alerting rules, a security report, wherein the security report includes at least one of (i) the case file, (ii) portions of the case file indicative of suspicious activity, (iii) an objective identifier associated with the case file, and (iv) a severity level of the suspicious activity in the case file; and transmit the security report to safety and security personnel, wherein the security report is used to objectively monitor and stop a user identified by the objective identifier associated with the case file.

20. The system of claim 13, wherein the computing system is further configured to associate the structured data and the structured system-based inferences based on:

assigning, for each of the structured data and the structured system-based inferences, a security event category of the plurality of security event categories;

determining whether a threshold amount of the structured data and the structured system-based inferences have the same (i) security event category, (ii) objective identifiers and (iii) timestamps that are within a threshold timeframe; and linking, based on determining that the structured data and the structured system-based inferences have the same security event category, the threshold amount of the structured data and the structured system-based inferences in a same case file.

* * * * *